(12) United States Patent
Henkel et al.

(10) Patent No.: US 6,691,305 B1
(45) Date of Patent: Feb. 10, 2004

(54) OBJECT CODE COMPRESSION USING DIFFERENT SCHEMES FOR DIFFERENT INSTRUCTION TYPES

(75) Inventors: Jörg Henkel, Princeton, NJ (US);
Wayne Wolf, Princeton, NJ (US);
Haris Lekatsas, Princeton, NJ (US)

(73) Assignees: NEC Corporation, Tokyo (JP);
Princeton University, Princeton, NJ (US)

( * ) Notice: Subject to any disclaimer, the term of this patent is extended or adjusted under 35 U.S.C. 154(b) by 0 days.

(21) Appl. No.: 09/556,927

(22) Filed: Apr. 21, 2000

Related U.S. Application Data

(60) Provisional application No. 60/164,607, filed on Nov. 10, 1999.

(51) Int. Cl.$^7$ ................................................. G06F 9/45
(52) U.S. Cl. ........................... 717/136; 712/41; 710/68
(58) Field of Search .......................... 712/41; 717/136; 710/68

(56) References Cited

U.S. PATENT DOCUMENTS

| | | | | |
|---|---|---|---|---|
| 6,216,213 B1 | * | 4/2001 | Breternitz et al. | 711/710 |
| 6,233,674 B1 | * | 5/2001 | Elnozahy | 712/227 |
| 6,263,429 B1 | * | 7/2001 | Siska | 712/245 |

OTHER PUBLICATIONS

Texas Instruments Inc., *TI's 0.07–Micron CMOS Technology Ushers in Era of Gigahertz DSP and Analog Performance*, pp. 1–4, 1999.

T.M. Kemp, R.K. Montoye, J.D. Harper, J.D. Palmer and D.J. Auerbach, A Decompression Core for PowerPC, IBM J. Res. Develop. vol. 42, No. 6, pp. 807–811, Nov. 1988.

T. Okuma, H. Tomiyama, A. Inoue, E. Fajar and H. Yasuura, Instruction Encoding Techniques for Area Minimization of Instruction ROM, IEEE, pp. 125–130, 1998.

Luca Benini, Alberto Macii, Encrico Macii and Massimo Poncino, Selective Instruction Compression for Memory Energy Reduction in Embedded Systems, ACM, pp. 206–211, 1999.

(List continued on next page.)

*Primary Examiner*—Kenneth S. Kim
(74) *Attorney, Agent, or Firm*—Sughrue Mion, PLLC

(57) ABSTRACT

A code compression method for system-level power optimization that lessens the requirements imposed on main memory size. The method reduces the power consumption of a complete system comprising a CPU, instruction cache, data cache, main memory, data buses and address bus. The method includes extracting compressible instruction and data portions from executable code, creating a mathematical model of the extracted code portions, class the individual instructions in the extracted portions based upon their operation codes and compressing the instructions. The compressed instructions are further compressed when extracted from memory by using bus compaction. The method is also embodied in a computer system with a processor and a memory adapted to perform the steps of the method to compress the extracted instruction portions. Additionally, the method is embodied on a computer program product bearing software instructions adapted to perform the steps of the method to compress the extracted instruction portions. The invention also has an apparatus utilizing a post-cache architecture that has a decompression engine that decompresses instructions that have been compressed using the method of the invention. The apparatus extracts the compressed instructions from memory or the instruction/data cache using a bus compression technique to save power as the compressed instructions/data traverses the bus.

17 Claims, 18 Drawing Sheets

OTHER PUBLICATIONS

Bharat P. Dave, Ganesh Lakshminarayna, Niraj K. Jha, COSYN: Hardware–Software Co–Synthesis of Embedded Systems, ACM, pp. 703–708, 1997.

Inki Hong, Darko Kirovski, Gang Qu, Miodrag Potkonjak and Mani B. Srivastava, Power of Optimization of Variable Voltage Core–Based Systems, ACM, pp. 176–181, 1998.

Tohru Ishihara and Hiroto Yasuura, Voltage Scheduling Problem for Dynamically Variable Voltage Processors, ACM, pp. 197–202, 1998.

Cheng–Ta Hsieh, Massoud Pedram, Gaurav Mehta and Fred Rastgar, Profile–Driven Program Synthesis for Evaluation of System Power Dissipation, ACM, pp. 576–581, 1997.

Vivek Tiwari, Sharad Malik, Andrew Wolfe and Mike Tien–Chien Lee, Instruction Level Power Analysis and Optimization of Software, Journal of VLSI Signal Processing, pp. 1–18, 1996.

Vivek Tiwari, Sharad Malik and Andrew Wolfe, Power Analysis of Embedded Software: A First Step Towards Software Power Minimization, IEEE Transactions on VLSI Systems, Dec. 1994.

Mike Tien–Chen Lee, Vivek Tiwari, Sharad Malik and Masahiro Fujita, Power Analysis and Minimization Techniques for Embedded DSP Systems, Dec. 1996.

Qinru Qiu, Qing Wu and Massoud Pedram, Stochastic Modeling of a Power–Managed System: Construction and Optimization, ACM, pp. 194–199, 1999.

Luca Benini, Allesandro Bogliolo, Giuseppe A. Paleologo and Giovanni De Micheli, Policy Optimization for Dynamic Power Management, IEEE Transactions on Computer–Aided Design of Integrated Circuits and Systems, vol. 18, No. 6, pp. 813–833, Jun. 1999.

William Fornaciari, Donatella Sciuto and Cristina Silvano, Power Estimation for Architectural Exploration of HW/SW Communication on System–Level Buses, ACM, pp. 152–156, 1999.

Mircea R. Stan and Wayne P. Burleson, Bus–Invert Coding for Low–Power I/O, IEEE Transaction on Very Large Scale Integration (VLSI) Systems, vol. 3, No. 1, pp. 49–58, Mar. 1995.

Tony Givargis and Frank Vahid, Interface Exploration for Reduced Power in Core–Based Systems, IEEE, pp. 117–122, 1998.

Jue–Hsien Chern, Jean Huang, Lawrence Arledge, Ping–Chung Li, and Ping Yang, Multilevel Metal Capacitance Models for CAD Design Synthesis Systems, IEEE Electron Device Letters, vol. 13, No. 1, pp. 32–34, Jan. 1992.

Yanbing Li and Jörg Henkel, A Framework for Estimating and Minimizing Energy Dissipation of Embedded HW/SW Systems, ACM, pp. 188–193, 1998.

Paul G. Howard and Jeffrey Scott Vitter, *Practical Implementations of Arithmetic Coding,* Brown University, pp. 1–30, 1991 (a similar version appears in Image and Text Compression, pp 85–112, 1992).

G.V. Cormack and R.N.S. Horspool, Data Compression Using Dynamic Markov Modelling, The Computer Journal, vol. 30, No. 6, pp. 541–550, 1987.

Jacob Ziv and Abraham Lempel, A Universal Algorithm for Sequential Data Compression, IEEE Transactions on Information Theory, vol. IT–23, No. 3, pp. 337–343, May 1977.

Ian H. Witten, Radford M. Neal and John G. Cleary, Arithmetic Coding for Data Compression, Communications of the ACM, vol. 30, No. 6, pp. 520–540, Jun. 1987.

Nagisa Ishiura and Masayuki Yamaguchi, Instruction Code Compression for Application Specific VLIW Processors Based on Automatic Field Partitioning, pp. 105–109. (Research Paper).

Darko Kirovski, Johnson Kin and William H. Mangione–Smith, *Procedure Based Program Compression,* The Departments of Computer Science and Engineering, The University of California at Los Angeles.

Kevin D. Kissell, MIPS16: High–Density MIPS for the Embedded Market, (A version of this paper appears in the proceedings of the RTS97 conference).

Michael Kozuch and Andrew Wolfe, Compression of Embedded System Programs, (Appeared in ICCD 1994).

Guido Araujo, Paulo Centoducatte, Mario Cortes and Ricardo Pannain, Code Compression Based on Operand Factorization (Research Paper).

Martin Benes, Andrew Wolfe and Steven M. Nowick, A High–Speed Asynchronous Decompression Circuit for Embedded Processors (Research Paper).

Martin Benes, Steven M. Nowick and Andrew Wolfe, A Fast Synchronous Huffman Decoder for Compressed–Code Embedded Processors (Research Paper).

Luca Benini, Alberto Macii, Enrico Macii and Massimo Poncino, Selective Instruction Compression for Memory Energy Reduction in Embedded Systems, ACM, pp. 206–211, 1999.

Peter L. Bird and Trevor N. Mudge, An Instruction Stream Compression Technique, EECS Department, University of Michigan, (Technical Report) pp. 1–21, Nov. 27, 1996.

John Bunda, Donald Fussell, Roy Jenevein and W.C. Athas, *16–Bit v. 32–Bit Instructions for Pipelined Microprocessors,* Department of Computer Sciences, The University of Texas at Austin, (Technical Report) pp. 1–28, Oct. 23, 1992.

Paulo Centoducatte, Guido Araujo and Ricardo Pannain, *Compressed Code Execution on DSP Architectures* (Research Paper).

I–Cheng K. Chen, Peter L. Bird and Trevor Mudge, *The Impact of Instruction Compression of I–cache Performance,* University of Michigan, Technical Report CSE–TR–330–97, University of Michigan, pp. 1–7.

Lars Raeder Clausen, Ulrik Pagh Schultz, Charles Consel and Gilles Muller, *Java Bytecode Compression for Embedded Systems,* Institut De Recherche En Informatique Et Systèmes Aléatoires (IRISA), Publication No. 1213, pp. 1–22, Dec. 1998.

Thomas M. Conte, Sanjeev Banerjia, Sergei Y. Larin, Kishore N. Menezes and Sumedh W. Sathaye, Instruction Fetch Mechanisms for VLIW Architectures with Compressed Encodings, IEEE, pp. 201–211, 1996.

Keith D. Cooper and Nathaniel McIntosh, *Enhanced Code Compression for Embedded RISC Processors,* (Research Paper).

Jens Ernst, William Evans, Christopher W. Fraser, Steven Lucco and Todd A. Proebsting, *Code Compression,* (Research Paper).

Christopher W. Fraser and Todd A. Proebsting, *Custom Instruction Sets for Code Compression,* pp. 1–9, Oct. 19, 1995.

Jan Hoogerbrugge, Lex Augusteijn, Jeroen Trum and Rik Van de Wiel, A Code Compression System Based on Pipelined Interpreters, Software Practice and Experience, pp. 1005–1023, 1999.

David A. Huffman, *A Method for the Construction of Minimum–Redundancy Codes,* Proceedings of the I.R.E., pp. 1098–1101, Sep. 1952.

Charles Lefurgy, Eva Piccininni and Trevor Mudge, Evaluation of a High Performance Code Compression Method, IEEE, 1999.

Charles Lefurgy, Eva Piccininni and Trevor Mudge, *Reducing Code Size with Run Time Decompression,* EECS Department, University of Michigan, (Research Paper).

Charles Lefurgy, Peter Bird, I–Cheng Chen and Trevor Mudge, Improving Code Density Using Compression Techniques, IEEE, 1999.

Charles Lefurgy and Trevor Mudge, *Code Compression for DSP,* EECS Department, University of Michigan, CSE–TR–380–98, pp. 1–5.

Charles Lefurgy and Trevor Mudge, *Fast Software–managed Code Decompression,* EECS Department, University of Michigan, presented at CASES '99, pp. 1–5, Oct. 1–3, 1999.*

Haris Lekatsas and Wayne Wolf, *Code Compression for Embedded Systems,* Department of Electrical Engineering, Princeton University, (Research Paper).*

Haris Lekatsas and Wayne Wolf, *SAMC: A Code Compression Algorithm for Embedded Processors,* Department of Electrical Engineering, Princeton University, pp. 1–17, Nov. 1, 1999.*

Haris Lekatsas and Wayne Wolf, *Random Access Decompression Using Binary Arithmetic Coding,* Department of Electrical Engineering Princeton University, (Research Paper).*

Stan Y. Liao, Sprinivas Devadas and Kurt Keutzer, *Code Density Optimization for Embedded DSP Processors Using Data Compression Techniques,* (Research Paper).*

Stan Liao, Sprinivas Devadas and Kurt Keutzer, *A Text–Compression–Based Method for Code Size Minimization in Embedded Systems,* pp. 1–38, 1998.

Advanced RISC Machines (ARM), *An Introduction to Thumb™,* pp. 9–26, Mar. 1995.

Maarten Wegdam, *Compact Code Generation through Custom Instruction Sets,* Nat. Lab. Unclassified Report 822/98, pp. 1–60, Sep. 1998.

Andrew Wolfe and Alex Chanin, Executing Compressed Programs on An Embedded RISC Architecture, (Appears in Proceedings of 25th Annual International Symposium on Microarchitectures), pp. 1–19, Dec. 1992.

Yukihiro Yoshida, Boa–Yu Song, Hiroyuki Okuhata, Takao Onoye and Isao Shirakawa, An Object Code Compression Approach to Embedded Processors, ACM, pp. 265–268, 1997.

* cited by examiner

| State | Prob(MPS) | LPS | MPS |
|---|---|---|---|
| [0,8) | 7/8 | 000, [0,8) | -, [1,8) |
|  | 6/8 | 00, [0,8) | -, [2,8) |
|  | 4/8 | 0, [0,8) | 1, [0,8) |
| [1,8) | 6/7 | 001, [0,8) | -, [2,8) |
|  | 5/7 | 0F, [0,8) | -, [3,8) |
|  | 4/7 | 0, [2,8) | 1, [0,8) |
| [2,8) | 5/6 | 010, [0,8) | -, [3,8) |
|  | 4/6 | 01, [0,8) | 1, [0,8) |
| [3,8) | 4/5 | 011, [0,8) | 1, [0,8) |
|  | 3/5 | FF, [0,8) | 1, [2,8) |

```
Function encodeBasicBlock ()
{
    IS = MS = 0;                                // Interval and Markov State
    inverse_flag = 0; prevcompressed_word = 0; num input_bits = 0;

while(1)
        mask = 0x80000000;                      // use this to get bits
        output = 0;                             // output bits so far while (mask>0){
            if (interval_state == 0) {
                prev_bit = mask & prevcompressed_word;
                if (MPSOutputBit(IS, MS) prevbit) ( inverse_flag = 1; }
                else { inverseflag = 0; }
            } out_bits = encode1bit(getInputBit(), IS, MS, inverse_flag);
            mask = mask >> length(outbits);    // point to previous bit
            output = output >> length(outbits) | outbits;

if (--+num input_bits == Basic_Block_Size){
            store (output,EOB()); // Store current output + BOB bits
            return; }
        }
        store (output); prevcompressed_word = output;
    }
}
```

*FIG. 9*

| Table Entry | Encoded Bits | Decoded Bits | Shift & Delete | Next Entry |
|---|---|---|---|---|
| IS=[0,8), MS=0 | 1 → 0 | MMM(010) | $S_1$ | [0,8), 1 |
| MPOS=0 | 011 → 100 | MML(011) | $S_3$ | [0,8), 3 |
|  | 010 → 101 | ML(00) | $S_1, D_1$ | [0,8), 8 |
|  | 001 → 110 | ML(00) | $S_1, D_1$ | [0,8), 8 |
|  | 000 → 111 | L(1) | $S_5$ | [0,8), 6 |
| IS=[0,8), MS=6 | 11 | MMMMM(101010) | $S_5$ | [0,8), 1 |
| MPOS=2 | 1011 | MMMML(101011) | $S_7$ | [0,8), 3 |
|  | 1010 | MMML(10100) | $S_7$ | [0,8), 8 |
|  | 100 | MML(1011) | $S_4, D_2$ | [0,8), 7 |
|  | 011 | MML(l011) | $S_4, D_2$ | [0,8), 7 |
|  | 010 | ML(100) | $S_6$ | [0,8), 0 |
|  | 00 | L(11) | $S_5$ | [0,8), 11 |

*FIG. 10*

NO BUS PACKING

BUS PACKING

OBJECT CODE COMPRESSION USING DIFFERENT SCHEMES FOR DIFFERENT INSTRUCTION TYPES

CROSS-REFERENCES TO RELATED APPLICATIONS

This application is an application filed under 35 U.S.C. §111(a), claiming benefit pursuant to 35 U.S.C. §§119-120 of the filing date of the Provisional Application Serial No. 60/164,607 filed on Nov. 10, 1999, pursuant to 35 U.S.C. §111(b). The Provisional Application Serial No. 60/164,607 is incorporated herein by reference for all it discloses.

BACKGROUND OF THE INVENTION

1. Technical Field of the Invention

This invention is related to a method and apparatus for compressing and decompressing object code instructions that are included in a software program that executes on a computer system. In particular, the compressing of object code instructions for a computer system provides for lower power consumption by the computer, more efficient transferal of compressed object code instructions from the memory storage devices, and a reduction in the number and size of power-consuming memory storage devices. The decompression apparatus of the invention advantageously uses a decompression engine to achieve the energy consumption savings incorporated into the compressed object code instructions. The invention is embodied in a compression method that compresses object code instructions for a computer system, a computer system for implementing the compression method, a computer program product bearing software instructions that implement the compression method, a decompression method that decompresses the compressed object code instructions and a decompression engine that decompresses the compressed object code instructions.

2. Description of the Related Art

The following references provide useful background information on the indicated topics, all of which relate to the invention, and are incorporated herein by reference:

M. Keaton and P. Bricaud, *Reuse Methodology Manual for System-On-A-Chip Designs*, Kluwer Academic Publishers (1998);

TI's 0.07 *Micron CMOS Technology Ushers In Era of Gigahertz DSP and Analog Performance*, Texas Instruments, (1998);

T. M. Kemp, R. K. Montoye, J. D. Harper, J. D. Palmer and D. J. Auerbach, *A Decompression Core for PowerPC*, IBM Journal of Research and Development, vol. 42(6), pp. 807–812 (November 1998);

Y. Yoshida, B. Y. Song, H. Okuhata and T. Onoye, *An Object Code Compression Approach to Embedded Processors*, Proceedings of the International Symposium on Low Power Electronics and Design, pp. 265–268 (August 1997);

T. Okuma, H. Tomiyama, A. Inoue, E. Fajar and H. Yasuura, *Instruction Encoding Techniques for Area Minimization of Instruction ROM*, International Symposium on System Synthesis, pp. 125–130 (December 1998);

A. Wolfe and A. Chanin, *Executing Compressed Programs on an Embedded RISC Architecture*, Proceedings of 25$^{th}$ Annual International Symposium on MicroArchitecture, pp. 81–91, (December 1992).

C. Lefurgy, P. Bird, I. Cheng and T. Mudge, *Code Density Using Compression Techniques*, Proceedings of the 30$^{th}$ Annual International Symposium on MicroArchitecture, pp. 194–203 (December 1997);

S. Y. Liao, S. Devadas and K. Keutzer, *Code Density Optimization for Embedded DSP Processors Using Data Compression Techniques*, Proceedings of the 1995 Chapel Hill Conference on Advanced Research in VLSI, pp. 393–399 (1995);

D. A. Huffman, *A Method for the Construction of Minimum-Redundancy Codes*, Proceedings of the IRE, vol. 4D, pp. 1098–1101 (September 1952);

L. Benini, A. Macii, E. Macii and M. Poncino, *Selective Instruction Compression for Memory Energy Reduction in Embedded Systems*, IEEE/ACM Proceedings of International Symposium on Low Power Electronics and Design, pp. 206–211 (1999);

B. P. Dave, G. Lakshminarayana, and N. K. Jha, COSYN: *Hardware-Software Co-Synthesis of Embedded Systems*, Proceedings of Design Automation Conference, pp. 703–708 (1997);

I. Hong, D. Kirovski, G. Qu, M. Potkonjak and M. Srivastava, *Power Optimization of Variable Voltage Core-Based Systems*, Proceedings of Design Automation Conference, pp.176–181 (1998);

T. Ishihara and H. Yasuura, *Voltage Scheduling Problem for Dynamically Variable Voltage Processors*, IEEE/ACM Proceedings of International Symposium on Low Power Electronics and Design, pp. 197–201 (1998);

C. Ta Hsieh, M. Pedram, G. Mehta and F. Rastgar, *Profile-Driven Program Synthesis for Evaluation of System Power Dissipation*, IEEE Proceedings of 34$^{th}$ Design Automation Conference, pp. 576–581, 1997;

V. Tiwari, *Logic and System Design for Low Power Consumption*, Ph.D thesis, Princeton University (November 1996);

Q. Qiu, Q. Wu and M. Pedram, *Stochastic Modeling of a Power-Managed System: Construction and Optimization*, IEEE/ACM Proceedings of International Symposium on Low Power Electronics and Design, pp. 194–199 (1999);

L. Benini, A. Bogliolo, G. Paleologo and G. De Micheli, *Policy Optimization for Dynamic Power Management*, IEEE Transactions on CAD, vol. 18, no. 6, pp. 813–33 (June 1999);

W. Fornaciari, D. Sciuto and C. Silvano, *Power Estimation for Architectural Explorations of HW/SW Communication on System-Level Buses*, HW/SW Codesign Workshop, Rome (May 1999);

M. R. Stan and W. P. Burleson, *Bus-Invert Coding for Low Power I/O*, IEEE Transactions on VLSI (March 1995);

M. R. Stan and W. P. Burleson, *Limited-Weight Codes for Low Power I/O*, International Workshop on Low Power Design (April 1994);

T. Givargis and F. Vahid, *Interface Exploration for Reduced Power in Core-Based Systems*, International Symposium on System Synthesis (December 1998);

Jue-Hsien Chern, et al., *Multilevel Metal Capacitance Models for CAD Design Synthesis Systems*, IEEE Electron Device Letters, vol. 13, no. 1, pp. 32–34 (January 1992).

P. G. Howard and J. S. Vitter, *Practical Implementations of Arithmetic Coding*, invited paper in Images and Text Compression (Kluwer Academic Publishers, Norwell, Mass.).

There will now be provided a discussion of various topics to provide a proper foundation for understanding the invention.

The advent of new VLSI technologies as well as the advent of state-of-the-art design techniques like core-based System-on-a-Chip (hereinafter "SOC") design methodologies, such as those described by Keaton and Bricaud in *Reuse Methodology Manual for System-on-a-Chip Designs*, has made multi-million gate chips a reality. SOC designs are especially important to low-power devices like personal digital assistants, cellular phones and digital cameras. Obviously, since the amount of available energy in a low-power device is limited, these devices have to wisely budget energy consumption in order to enable the user to increase the number and/or length of telephone calls, to shoot more pictures, etc., between recharging phases. From the viewpoint of a system designer, the reduction of energy/power consumption is a major design goal. The physically important factor power per square millimeter must be kept at reasonable levels to avoid overheating, malfunctions and electro-migration. Keeping power per square millimeter at reasonable levels leads to longevity of the device. Due to the various problems related to high energy and power consumption, designers have come up with diverse approaches at all levels of abstraction, starting from the physical level up to the system level. Experience shows that a high-level method may provide additional degrees of freedom that result in a more optimized design. However, a major drawback in system-level optimization is the complexity of the design space as a result of the vast amount of possible parameters. In order to conduct efficient system-level optimizations, powerful design space explorations are needed. In case of system-level power optimization, a tool that delivers fast and reliable power estimates for various chosen system parameters in order to evaluate the impact of any optimization step is required.

Code compression has increasingly become a popular technique, mainly as a method to reduce chip area in embedded computers. Most methods targeted for embedded systems use a run-time decompression unit to decode compressed instructions on-the-fly. Wolfe and Chanin were the first to propose such a scheme, wherein Huffman codes were used to encode cache blocks. A hardware decompression unit is interposed between the cache and main memory to decompress cache blocks to their original size before they are inserted into the cache. Kemp, et al. at IBM, developed a similar technique using sophisticated Huffman tables. Other techniques use a table to index sequences of frequently appearing instructions using a hardware decompression module as proposed by Lefurgy, et al., or decompress the compressed object code instructions completely in software, as proposed by Liao, et al. Okuma, et al. proposed an encoding technique that takes into account fields within instructions.

Most of the previous work has focused on memory optimization. Yoshida, et al. proposed a logarithmic-based compression scheme that can result in power reduction as well. A recent approach proposed by Benini, et al. investigated the impact of code compression on the power consumption of a system with no cache. However, the impact of code compression on other system parts, like caches and CPUs, was not investigated.

Various approaches have been proposed to minimize power consumption of diverse system parts. Stan and Burleson describe a bus-invert technique that reduces bus power consumption. If the Hamming distance of two consecutive data words is greater than half the word size, the inverted data is sent. Givargis and Vahid have developed a set of mathematical formulas for rapidly estimating bit switching activities on a bus with a given size and encoding scheme. Combined with the capacitance estimation formulas by Chern, et al., the mathematical formulas can rapidly estimate and optimize bus power consumption. Fornaciari, et al. proposed another bus power optimization approach using various bus power encoding schemes. At the architectural-level for single system components (i.e., not considering any trade-offs between various system parts), Hsieh et al. investigated high performance microprocessors, and derived specific software synthesis algorithms to minimize power. In addition, Tiwari has investigated the power consumption at the instruction-level for different CPU and DSP architectures and derived specific power optimizing compilation strategies.

Other approaches focus on a whole system in order to optimize for low power consumption. For example, Dave, et al. introduced a co-design methodology that optimizes for power and performance at the task-level. Hong, et al. and Ishihara, et al. exploit the technique of variable voltage scaling in order to minimize power consumption. Qiu, et al. and Benini, et al., among others, have explored system power management approaches.

SUMMARY OF THE INVENTION

The invention has been made in view of the above circumstances and has an object to overcome the above problems and limitations of the prior art.

Additional objects and advantages of the invention will be set forth in part in the description that follows and in part will be obvious from the description, or may be learned by practice of the invention. The objects and advantages of the invention may be realized and attained by means of the instrumentalities and combinations particularly pointed out in the appended claims.

An object of the invention is to provide a method for compression of object code instructions for an embedded computer.

It is a further object of the invention is to provide a computer system adapted to providing a method for compression of object code instructions for an embedded computer.

It is a further object of the invention is to provide a computer program product bearing software instructions adapted to command a computer system to compress object code instructions for an embedded computer.

It is a further object of the invention to provide an apparatus for decompression of compressed object code instruction prior to their execution by a central processing unit of an embedded computer.

According to the invention, uncompressed object code instructions can be advantageously decomposed into predetermined instruction classes. Each predetermined instruction class is compressed differently from each other predetermined instruction class.

According to the invention, certain instruction classes are used to derive a mathematical model used for compression and decompression of object code instructions.

According to the invention, the decompression engine can decompress multiple instruction simultaneously from different predetermined instruction classes.

Preferably, the invention provides a method for compressing uncompressed object code instructions from an executable program for an embedded computer, wherein the uncompressed object code instructions are compressed to reduce power consumption, the method comprising the decomposition of uncompressed object code instructions into at least four predetermined instruction classes, excluding certain uncompressed object code instructions in order to derive a mathematical model to use for compressing predetermined uncompressed object code instructions, compressing uncompressed object code instructions from at least one of the plurality of predetermined instruction classes, wherein the uncompressed object code instructions are compressed using the derived mathematical model, and building a decoding table for the compressed object code instructions in accordance with the derived mathematical model, compressing uncompressed object code instructions from at least one of the plurality of predetermined instruction classes, wherein an address offset is added to each object code instruction following its compression; and patching each address offset that was added to a compressed instruction.

According to the invention, a decompression table that uses indexing is constructed for certain instruction classes known as fast dictionary instructions.

According to the invention, predetermined bit sequences are appended to the compressed object code instructions in order to identify the instruction class for decompression.

According to the invention, a second decompression table is built using non-branching object code instruction and table-based mathematical encoding.

According to the invention, address offsets in branching instructions are patched in order to properly point into compressed address space.

Preferably, the invention provides a computer system adapted to compressing uncompressed object code instructions from an executable program for an embedded computer, wherein the uncompressed object code instructions are compressed to reduce power consumption, the computer system including a processor and a memory including software instructions adapted to enable the computer system to perform the steps of decomposing the uncompressed object code instructions into at least four predetermined instruction classes, excluding certain uncompressed object code instructions in order to derive a mathematical model to use for compressing predetermined uncompressed object code instructions, compressing uncompressed object code instructions from at least one of the plurality of predetermined instruction classes, wherein the uncompressed object code instructions are compressed using the derived mathematical model, and building a decoding table for the compressed object code instructions in accordance with the derived mathematical model, compressing uncompressed object code instructions from at least one of the plurality of predetermined instruction classes, wherein an address offset is added to each object code instruction following its compression; and patching each address offset that was added to a compressed instruction.

According to the invention, the computer system can download compressed object code to a memory resident on an embedded computer system, and then dynamically debug the downloaded compressed object code.

Preferably, the invention provides a computer program product for enabling a computer system to compress uncompressed object code instructions from an executable program for an embedded computer, wherein the uncompressed object code instructions are compressed to reduce power consumption, the computer program product including software instructions for enabling the computer system to perform predetermined operations, and a computer readable medium bearing the software instructions, the predetermined operations including decomposing the uncompressed object code instructions into at least four predetermined instruction classes, excluding certain uncompressed object code instructions in order to derive a mathematical model to use for compressing predetermined uncompressed object code instructions, compressing uncompressed object code instructions from at least one of the plurality of predetermined instruction classes, wherein the uncompressed object code instructions are compressed using the derived mathematical model, and building a decoding table for the compressed object code instructions in accordance with the derived mathematical model, compressing uncompressed object code instructions from at least one of the plurality of predetermined instruction classes, wherein an address offset is added to each object code instruction following its compression, and patching each address offset that was added to a compressed instruction.

Preferably, the invention provides an embedded computer for executing compressed object code instructions, wherein the object code instructions have been compressed to reduce power consumption, the embedded computer including a central processing device, a storage device, a memory cache device, a decompression engine interposed between the memory cache device and the central processing device, and an interface bus of a predetermined bit width interconnecting the central processing device, the storage device, the memory cache device and the decompression engine allowing communication therebetween, wherein compressed object code instructions are decompressed by the decompression engine prior to their transmittal to the central processing device.

According to the invention, the decompression engine includes a fast dictionary look-up table device, a branch control device, a decoding device and a controller for coordinating the decompression of compressed object code instructions. The controller generates signals for use by the various devices during the decompression of compressed object code instructions.

Preferably, the invention further provides a circuit for decompressing compressed object code instructions that have been compressed to reduce power consumption, the circuit comprising an input buffer circuit that receives compressed object code instructions, a first decoding circuit having an input connected to an output of the input buffer circuit, a second decoding circuit having an input connected to the output of the input buffer circuit, a third decoding circuit having an input connected to the output of the input buffer circuit, an output buffer circuit having an input connected to an output from each of the first, second and third decoding circuits; and a controller circuit controlling the first decoding circuit, the second decoding circuit, the third decoding circuit and the output buffer circuit, wherein the controller circuit coordinates the decompression of compressed object code instructions.

According to the invention, the input buffer circuit stores compressed object code instructions in a memory storage device, a multiplexing circuit and a decoder to control the multiplexing circuit.

According to the invention, the output buffer circuit includes a memory storage device connected to the first and second decoding devices, a multiplexing circuit connected to the memory storage device and the third decoding device, and a second memory storage unit connected to the multiplexing circuit.

Preferably, the invention further provides a circuit for decompressing compressed object code instructions that have been compressed to reduce power consumption, the circuit comprising an input buffer circuit for receiving and distributing compressed object code instructions transferred from a memory storage device, a first decoding circuit for decompressing compressed fast dictionary instructions, a second decoding circuit for decompressing compressed branching object code instructions, a third decoding circuit for decompressing non-branching object code instructions, an output buffer circuit for receiving and ordering the output of the first, second and third decoding circuit,; and a controller circuit controlling the first decoding circuit, the second decoding circuit, the third decoding circuit and the output buffer circuit, wherein the controller circuit coordinates the decompression of compressed object code instructions.

According to the invention, the controller circuit generates signals to control the decompression of the compressed object code. The controller generates signals to properly order the decompressed instructions prior to transmittal to a central processing unit, and also signals the central processing unit when its cannot accept more instructions for decompression.

The above and other objects and advantages of the invention will become apparent from the following detailed description and with reference to the accompanying drawing figures.

BRIEF DESCRIPTION OF THE DRAWINGS

The accompanying drawings, which are incorporated in and constitute a part of this specification illustrate embodiments of the invention and, together with the written description, serve to explain the objects, advantages and principles of the invention. In the drawings.

FIG. 9 is a pseudo-code function for encoding a block of uncompressed object code instructions;

FIG. 10 is a table that lists the decoding table entries for bits that have been encoded using the Markov model of FIG. 7;

DESCRIPTION OF THE PREFERRED EMBODIMENTS

Figure 1:
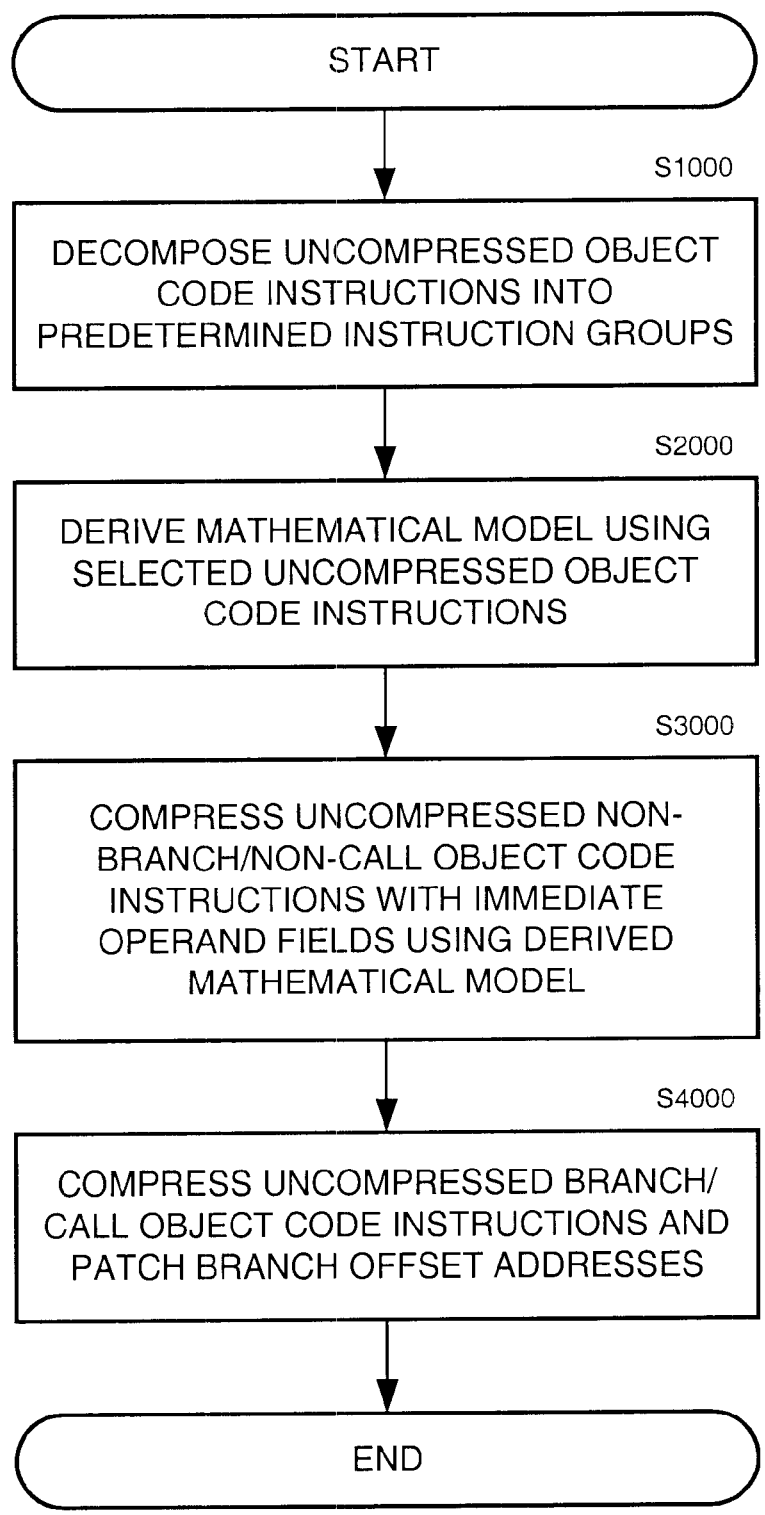
FIG. 1 illustrates the basic process flow of the compression method for object code instructions, according to an embodiment of the present invention.

Prior to describing the presently preferred embodiment of the invention, some details concerning the prior art will be provided to facilitate the reader's understanding of the invention and to set forth the meaning of various terms.

As used herein, the term "computer system" encompasses the widest possible meaning and includes, but is not limited to, standalone processors, networked processors, mainframe processors, and processors in a client/server relationship. The term "computer system" is to be understood to include at least a memory and a processor. In general, the memory will store, at one time or another, at least portions of executable program code, and the processor will execute one or more of the instructions included in that executable program code.

As used herein, the term "embedded computer system" includes, but is not limited to, an embedded central processor and memory bearing object code instructions. Examples of embedded computer systems include, but are not limited to, personal digital assistants, cellular phones and digital cameras. In general, any device or appliance that uses a central processor, no matter how primitive, to control its functions can be labeled has having an embedded computer system. The embedded central processor will execute one or more of the object code instructions that are stored on the memory. The embedded computer system can include cache memory, input/output devices and other peripherals.

As used herein, the terms "compressed object code instructions" and "uncompressed object code instructions" mean the software instructions comprising the executable program that is executed by a computer system or an embedded computer system. These executable instructions, in object code format, are compressed and decompressed by the present invention. In one embodiment of the present invention, these compressed object code instructions are downloaded by a computer system into an embedded computer system for execution. In other embodiments, the compressed object code instructions can be programmed into a read-only memory, dynamic random access memory, flash memory, electrically erasable memory or any other type of memory.

As used herein, the terms "branch instruction" and "call instruction" mean object code instructions that cause the program execution to jump to a new address location and continue execution therefrom. Typically, the satisfaction of a Boolean condition can cause the address jump (branch instruction), or the program execution can continue at a new address location unconditionally (call instruction). As used herein, the term "branching instruction" refers to either type of instruction, and object code instructions that do not cause an address jump are referred to as "non-branching instructions."

It will be appreciated that the term "predetermined operations" and the term "computer system software" mean substantially the same thing for the purposes of this description. It is not necessary to the practice of this invention that the memory and the processor be physically located in the same place. That is to say, it is foreseen that the processor and the memory might be in different physical pieces of equipment or even in geographically distinct locations.

As used herein, one of skill in the art will appreciate that "media" or "computer-readable media" may include a diskette, a tape, a compact disc, an integrated circuit, a cartridge, a remote transmission via a communications circuit, or any other similar medium useable by computers. For example, to distribute computer system software, the supplier might provide a diskette or might transmit the instructions for performing predetermined operations in some form via satellite transmission, via a direct telephone link, or via the Internet.

Although computer system software might be "written on" a diskette, "stored in" an integrated circuit, or "carried over" a communications circuit, it will be appreciated that, for the purposes of this discussion, the computer usable medium will be referred to as "bearing" the instructions for performing predetermined operations. Thus, the term "bearing" is intended to encompass the above and all equivalent ways in which instructions for performing predetermined operations are associated with a computer usable medium.

Therefore, for the sake of simplicity, the term "program product" is hereafter used to refer to a computer useable medium, as defined above, which bears instructions for performing predetermined operations in any form.

As used herein, the term "random access decompression," as used in reference to code compression, means that the decompression of any compressed object code code should be capable of starting at any point in the compressed object code or at compressed object code block boundaries. This contrasts to most file compression algorithms (e.g., GZIP) that compress and decompress a file serially and in its entirety.

As used herein, the term "word" is a unit of measure of storage, and is not meant to be synonymous with the term "instruction word." That is, there is no one-to-one correlation in size, either for uncompressed object code instructions or compressed object code instructions.

As used herein, the term "basic block" is used in an identical manner as in standard compiler technology. A basic block is a series of instructions that do not contain any branch or call instructions and also the only way to reach a basic block is through its first instruction, i.e., there is no branch landing anywhere within the basic block. A more formal definition can be found in Alfred J. Aho, Ravi Sethi and Jeffery D. Ullman, "*Compilers: Principles, Techniques and Tools*," Addison-Wesley Pub. Co. (1986).

As used herein, the term "byte alignment" refers to the requirement that the compressed blocks start at a byte boundary, thereby making the decompression easier. Within this disclosure, the terms "decoding" and "decompression" are used interchangeably.

The random access feature of the present invention presents an additional problem. When program execution jumps to a new location in the program, the problem arises in determining where the program execution is to continue without decompressing all the preceding blocks. Wolfe and Chanin propose using a table that maps uncompressed block positions (addresses) into compressed block positions. The main drawback of this method is that as the block size decreases, the overhead of storing the table increases. Lefurgy, et al. propose leaving the branching instruction untouched during the compression phase, and then patching the branching instruction address offsets to point to compressed space where the program execution continues. The present invention overcomes the limitations of both of these previous methods by compressing the branches as well as the other code. As used herein, the term "indexing" refers to the present invention's compression of the branches and the recalculating and patching the branching instruction address offsets.

A detailed description of the preferred embodiments of the invention will now be given referring to the accompanying drawings.

Certain features of the present invention will now be generally described in order to clarify the concepts of the present invention. In the present invention, both the compression and decompression of instructions uses table lookup techniques. Using a mathematical encoder in conjunction with a Markov model generates the compression table. *Text Compression* (Prentice Hall, New Jersey 1990) by T. C. Bell, J. G. Cleary and I. H. Witten, is considered a standard reference work and illustrates the concepts of mathematical decoding. Mathematical coding has significant advantages over the more well-known Huffman coding, and can perform very well when probabilities are highly skewed. See D. A. Huffman, *A Method for the Construction of Minimum-Redundancy Codes*, Proceedings of the IRE, vol. 4D, pp. 1098–1101 (September 1952), for more information regarding Huffman coding techniques. Another advantage enjoyed by mathematical coding is that coding efficiency at symbol boundaries is not lost. The table generated for mathematical coding is more general than Huffman coding and can give better compression.

Most compression algorithms used in practice need a probability model when encoding and decoding. In Huffman encoding, the Huffman table essentially contains the probability model, which is used to assign shorter codes to more frequent symbols. In Markov encoding, the Markov model gives the probabilities of 0's and 1's in instructions. Using these probabilities and a symbol table, compression is achieved by assigning shorter output when the probability of a symbol is high and longer when the probability of a symbol is low. Of course, the present invention is not limited to these to mathematical modeling techniques, as other encoding techniques can be used, e.g., Ziv-Lempel or dynamic Markov modeling.

The decompression engine of the present invention uses table look-up, much like Huffman decoding. Unlike Huffman decoding, finding the position of the code in the table is easier, thereby resulting in faster decompression. The present invention advantageously generates a look-up table that is generally larger than a Huffman table (e.g., up to 4 kbytes for larger applications). This is not a disadvantage and should be expected, since the present invention has significantly better compression performance. The reduction in overall program size justifies the use of the larger look-up table.

Another feature of the present invention is that the object code instructions are compressed such that, within the decompression engine, the branch control device that handles branching instruction address offsets must be able to point to byte-addresses instead of word-addresses. The present invention patches branching instruction address offsets to point to the addresses of the compressed object code instructions, as these addresses migrate during the compression process. Typically, in conventional compression techniques, a table is used to index basic blocks. The decompression engine of the present invention operates more economically because the time required for accessing a conventional look-up table is generally greater than the time required for decompression of the compressed branch offset. Moreover, a table comprising indices to small blocks takes up significant amounts of memory space. By using a field for counting the number of bytes occupied by the branching instruction address offsets, branching instructions can be compressed very effectively, while avoiding the table overhead.

Referring to FIG. 1, an embodiment of the present invention will now be described in summary fashion. This embodiment is directed to an embedded computer system, but this embodiment is not limiting on the present invention as the method described herein is applicable to all types of computer systems, both conventional and embedded. This embodiment of the invention compresses uncompressed object code instructions from an executable program to reduce power consumption by minimizing bit toggling and memory hardware requirements (e.g., reduction in cache size required and increase in cache hits). In Step S1000, the uncompressed object code instructions are decomposed into predetermined instruction classes. These instruction classes are used to identify the particular category of uncompressed object code instruction that is to be compressed, and also identify the appropriate identifier is appended to the compressed object code instruction. At Step S2000, all of the uncompressed object code instructions are reviewed and, during the review, certain uncompressed object code instructions are excluded. The uncompressed object code instructions that remain are used to create a mathematical model for use in compressing and decompressing object code instructions. Step S3000 compresses non-branching uncompressed object code instructions having an immediate operand field and builds a decoding table for the non-branching compressed instructions with an immediate operand field. Finally, Step S4000 compresses uncompressed object code instructions that are branching object code instructions. Subsequent to the compression of these types of object code instructions, the branching instruction address offsets are patched so that compressed branching object code instructions properly point into compressed instruction space.

Figure 2:
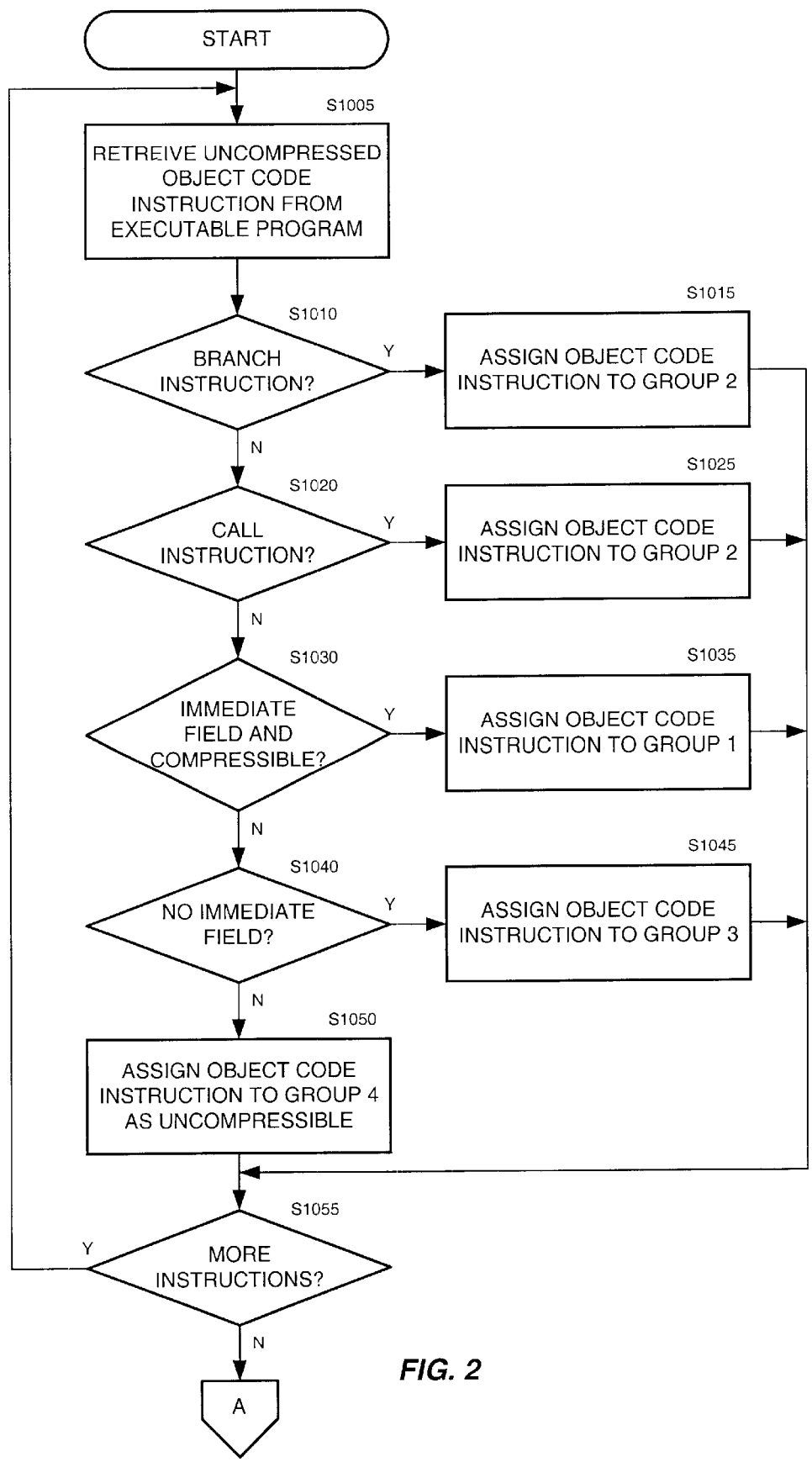
FIG. 2 illustrates a portion of the process flow of the compression method for object code instructions, according to an embodiment of the present invention, namely the decomposition of the object code instructions of an executable program for a computer system into predetermined instruction classes.

Referring to FIG. 2, the decomposition of the uncompressed object code instructions from the executable program for an embedded computer will now be discussed in greater detail. The preferred embodiment of the present invention separates uncompressed object code instructions into four predetermined instruction classes for compression purposes. In the preferred embodiment, the SPARC architecture will be used, but the principles of the present invention are applicable to other instruction sets, e.g., INTEL's x86 instruction set. The present invention must be able to differentiate between these four classes of object code instructions. Therefore, the present invention appends a predetermined code (also referred to as "tag bits") to the beginning of each compressed object code instruction to allow the decompression engine to identify the type of instruction.

As defined by the present invention, class 1 instructions are those object code instructions that have an immediate field. In addition, these object code instructions are not branch object code instructions, call object code instructions or sethi object code instructions (a SPARC instruction that sets the higher order bits of a register).

As defined by the present invention, class 2 instructions are those object code instructions that consist of branch object code instructions, call object code instructions and sethi object code instructions.

As defined by the present invention, class 3 instructions are those object code instructions that lack any immediate fields. The lack of immediate fields allows these object code instructions to be compressed into a single byte, wherein the single byte is used as an index into a decompression table. Decompression speeds up considerably, since for these compressed object code instructions, only one table lookup is necessary. An additional feature of this decomposition is when two class 3 instructions appear consecutively in the address space, the two object code instructions can be encoded within one byte, resulting in a large memory space savings (8 bits as opposed to 64).

As defined by the present invention, class 4 instructions are those object code instructions that have immediate fields, and are not branch object code instructions, call object code instructions or sethi object code instructions. Class 4 instructions cannot be compressed. These uncompressible object code instructions are rare, and are left intact by the present invention.

Executable programs tend to use a small subset of the entire instruction set, usually less than fifty instructions. Due to immediate fields, the total number of different 32-bit words appearing in programs is much larger. It is a feature of the present invention to condense all the different instructions with no immediate field (i.e., class 3) into a single byte since they are few in number, and to encode the rest which are harder to compress with a powerful compression algorithm. As described above, the single byte is used for indexing into a decompression table. Although all it is possible to encode the object code instructions using the compression method of the present invention, the present invention advantageously builds a fast index for class 3 instructions that significantly speeds up the decompression of class 3 instructions.

Referring to FIG. 2, the decomposition process of uncompressed object code instructions will be described in greater detail. At Step S1005, an uncompressed object code instruction to be decomposed into one of the four predetermined classes (i.e., class 1, class 2, class 3 and class 4) is extracted from the executable program for an embedded computer system. At Step S1010, a determination is made whether the extracted object code instruction is a branch instruction. If the extracted object code instruction is not a branch instruction, processing continues onto Step S1020. If the extracted object code instruction is a branch instruction, then it is assigned to the class 2 instruction grouping in Step S1015.

After the branch instruction is assigned to the class 2 instruction grouping, the process flow then switches to Step S1055, where a determination is made whether any more uncompressed object code instructions remain to be decomposed. If no more uncompressed object code instruction remain to be decomposed, then processing continues on to Step S2005. If more uncompressed object code instructions remain for decomposition, the process flow continues to Step S1005 and another uncompressed object code instruction is extracted from the executable program.

At Step S1020, a determination is made whether the extracted object code instruction is a call instruction. If the extracted uncompressed object code instruction is not a call instruction, processing continues onto Step S1030. If the extracted uncompressed object code instruction is a call instruction, then it is assigned to the class 2 instruction grouping in Step S1025.

After the call instruction is assigned to the class 2 instruction grouping, the process flow then switches to Step S1055, where a determination is made whether any more uncompressed object code instructions remain to be decomposed. If no more uncompressed object code instructions remain to be decomposed, then processing continues on to Step S2005. If more uncompressed object code instructions remain for decomposition, the process flow continues to Step S1005 and another uncompressed object code instruction is extracted from the executable program.

At Step S1030, a determination is made whether the extracted uncompressed object code instruction has an immediate field and is compressible. If the uncompressed object code instruction lacks an immediate field and is not compressible, processing continues onto Step S1040. If the extracted uncompressed object code instruction as an immediate field and is compressible, then it is assigned to the class 1 instruction grouping in Step S1035.

After the compressible object code instruction with an immediate field is assigned to the class 1 instruction grouping, the process flow then switches to Step S1055, where a determination is made whether any more uncompressed object code instructions remain to be decomposed. If no more uncompressed object code instructions remain to be decomposed, then processing continues on to Step S2005. If more uncompressed object code instructions remain for decomposition, the process flow continues to Step S1005 and another uncompressed object code instruction is extracted from the executable program.

At Step S1040, a determination is made whether the extracted uncompressed object code instruction lacks an immediate field. If the uncompressed object code instruction does have an immediate field, processing continues onto Step S1050. If the extracted uncompressed object code instruction lacks an immediate field, then it is assigned to the class 3 instruction grouping as a fast dictionary instruction in Step S1045.

After the instruction without an immediate field is assigned to the class 3 instruction grouping, the process flow then switches to Step S1055, where a determination is made whether any more uncompressed object code instructions remain to be decomposed. If no more uncompressed object code instructions remain to be decomposed, then processing continues on to Step S2005. If more uncompressed object code instructions remain for decomposition, the process flow continues to Step S1005 and another uncompressed object code instruction is extracted. An index value is assigned to each class 3 instruction.

At Step S1050, the extracted uncompressed object code instruction is assigned to the class 4 instruction group as an uncompressible object code instruction, as the extracted uncompressed object code instruction does not fall into any of the other instruction classes. Processing continues to Step S1055 after the assignment of the uncompressible object code instruction to the class 4 instruction group.

Figure 3:
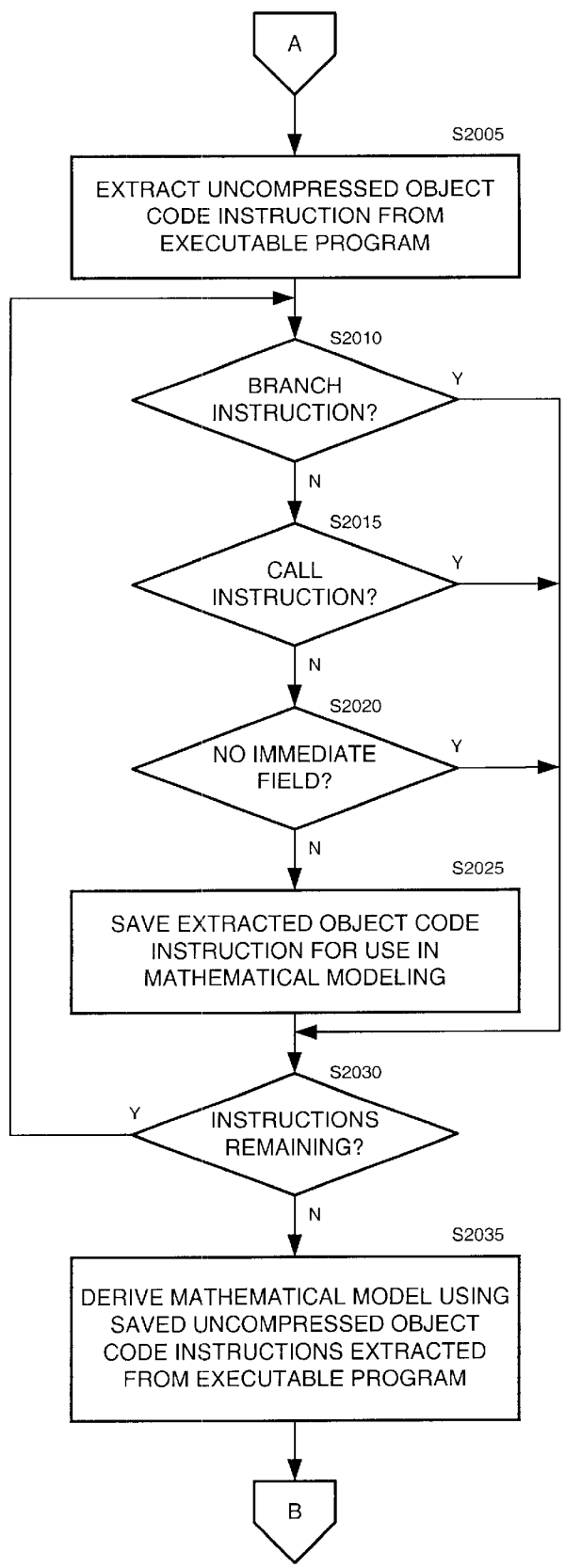
FIG. 3 illustrates a portion of the process flow of the compression method for object code instructions, according to an embodiment of the present invention, namely the extraction of object code instructions from an executable program for a computer system for use in developing a mathematical model for object code instruction compression.

The extraction of object code instructions for use in the derived mathematical model will now be discussed in greater detail. Referring to FIG. 3, at Step S2005, an uncompressed object code instruction is extracted from the executable program. At Steps S2010–S2020, the extracted uncompressed object code instruction is examined to determine whether the extracted uncompressed object code instruction is a call instruction, a branch instruction, or an instruction without an immediate field. At Step S2025, if the extracted instruction does not fall within any of those categories, then the extracted object code instruction is saved for use in mathematical modeling.

At Step S2030, after saving the extracted object code instruction for mathematical modeling, a determination is made whether more object code instructions remain for analysis. Instruction extraction and processing continues at Step S2005 if more uncompressed object code instructions remain for analysis. Otherwise, the process flow continues to Step S2035, where the saved uncompressed object code instructions are used to create a mathematical model for use in compressing object code instructions.

Figure 4:
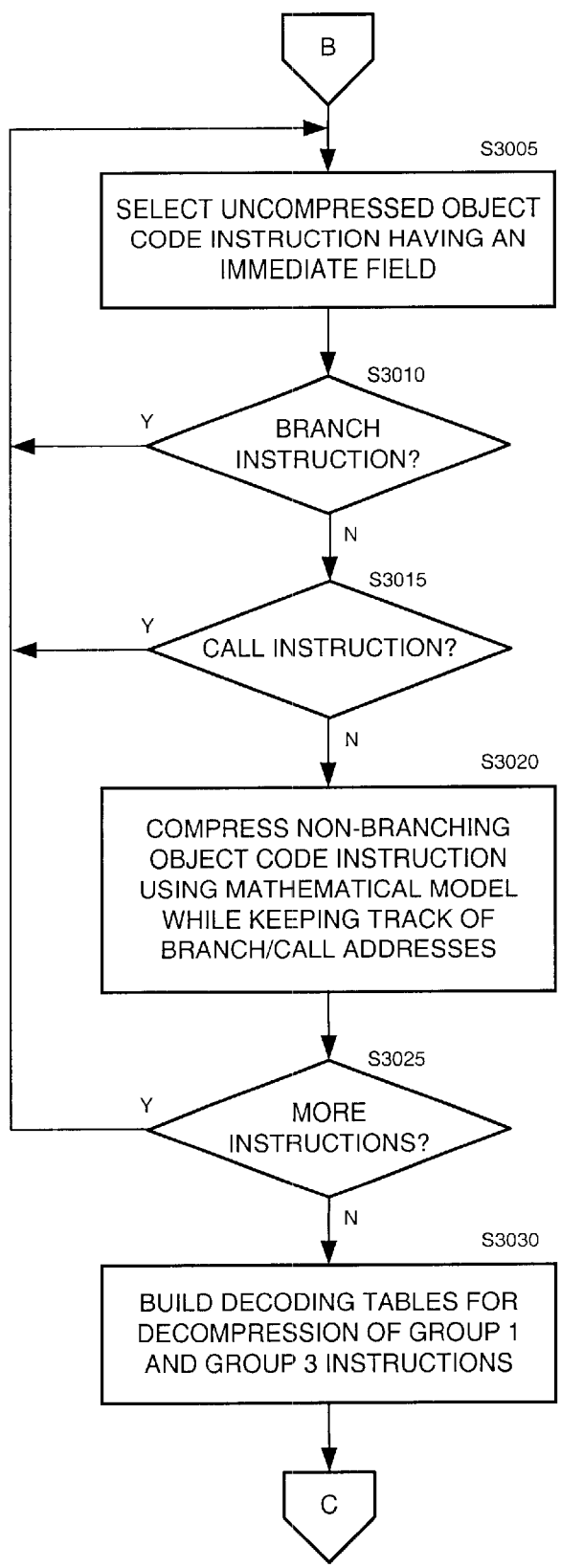
FIG. 4 illustrates a portion of the process flow of the compression method for object code instructions, according to an embodiment of the present invention, namely the compression of non-branching object code instructions with immediate fields and the compression of non-branching object code instructions without immediate fields.
Figure 5:
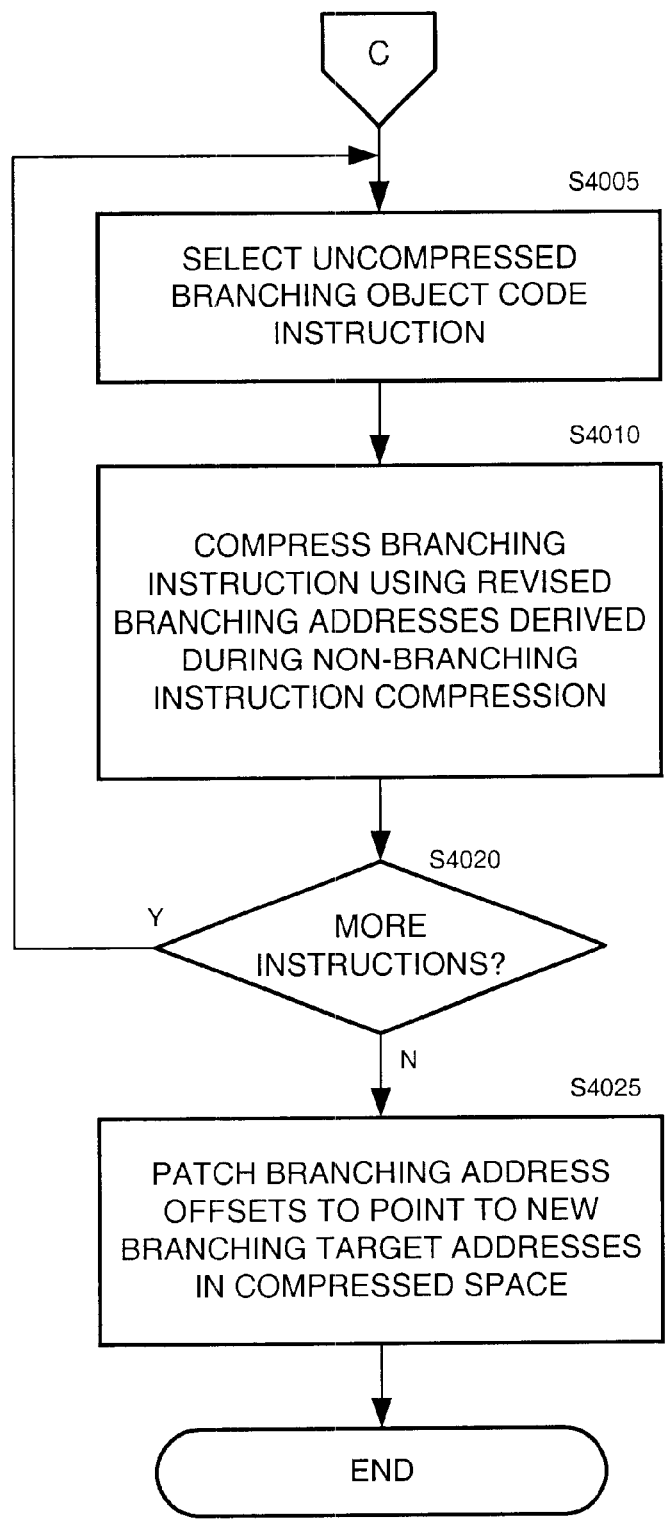
FIG. 5 illustrates a process flow of the compression method for object code instructions, according to an embodiment of the present invention, namely the compression of branching object code instructions and the re-targeting thereof of branching instruction addresses.

Following the derivation of a mathematical model to be used for compression and decompression, the compression method of the present invention continues with the selection and compression of object code instructions. Referring to FIG. 4, the compression of non-branching object code instructions with immediate fields will now be discussed in greater detail. At Step S3005, an uncompressed object code instruction having an immediate field is selected from the executable program for the embedded computer. At Steps S3010 and S3015, a determination is made whether the selected uncompressed object code instruction is a branching instruction. If the instruction is a branching instruction, then the process flow returns to Step S3005 to locate and select the next uncompressed object code instruction with an immediate field for potential compression. If the uncompressed object code instruction with the immediate field is not a branching instruction, then, in Step S3020, the object code instruction is compressed using the table-based mathematical coding derived in Step S2035. During the compression, it is imperative that the branching instruction addresses are kept track of in some fashion, i.e., a constantly updated lookup table. During the compression process, as instruction space grows smaller, the branching instruction addresses must be kept track of so that the address pointers contained within compressed branching instructions can be appropriately patched.

At Step S3025, a determination is made whether there are more uncompressed object code instructions to be compressed (i.e., object code instructions in general, not just non-branching instructions with immediate fields). If uncompressed object code instructions remain for potential compression, then process control returns to Step S3005. If no more uncompressed object code instructions remain for potential compression, then, at Step S3030, decompression tables are built for the class 1 and the class 3 instructions. The decompression table for the class 1 instructions uses the mathematical model derived in Step S2035. The decompression table for class 3 instructions is built as a fast dictionary table wherein an index into the table is appended to the compressed class 3 instruction. The index into the decoding table was described previously.

The compression of branching instructions, using the re-calculated branching instruction address targets that were obtained during the compression of the non-branching instructions. In Step S4005, an uncompressed branching instruction that was previously passed over during the earlier compression cycle is extracted from the executable program for the embedded computer system. At Step S4010, the extracted uncompressed object code instruction is compressed, and the branching instruction address targets derived during the compression of the class 1 and the class 3 instructions are used, depending upon the type of instruction being compressed. The branching instruction will be compressed according to a particular format, which will be described below. The branching instructions are not compressed using the mathematical model derived earlier. At Step S4020, a determination is made whether all the branching instructions have been compressed. If more branching instructions remain to be compressed, the process flow returns to Step S4005 to continue the compression of the remaining branching instructions. In Step S4025, the branching instruction address offsets in the compressed branching instructions are patched to reflect the final branching instruction addresses in compressed address space. At this point, the compression of the executable program for an embedded computer is essentially complete. The compressed executable program can now be downloaded into the embedded computer for execution and dynamic debugging, or burned into a ROM to be installed at a later date in an embedded computer.

The preferred embodiment of the present invention uses a table-based mathematical encoder following the work by Howard and Vitter. See P. G. Howard and J. S. Vitter, *Practical Implementations of Arithmetic Coding*, invited paper in Images and Text Compression (Kluwer Academic Publishers, Norwell, Mass.) pp. 85–112, for more information. The probabilities used to drive the mathematical encoder are derived from a semiadaptive Markov model that compresses instructions very effectively while not taking too much memory space.

Most compression algorithms used in practice need a probability model when encoding and decoding. In Huffman encoding, the Huffman table essentially contains the probability model, which is used to assign shorter codes to more frequent symbols. In Markov encoding, the Markov model gives the probabilities of 0's and 1's in instructions. Using these probabilities and a symbol table, compression is achieved by assigning shorter output when the probability of a symbol is high and longer when the probability of a symbol is low. Of course, the present invention is not limited to these to mathematical modeling techniques, as other encoding techniques can be used, e.g., Ziv-Lempel or dynamic Markov modeling.

Figures 6, 7:
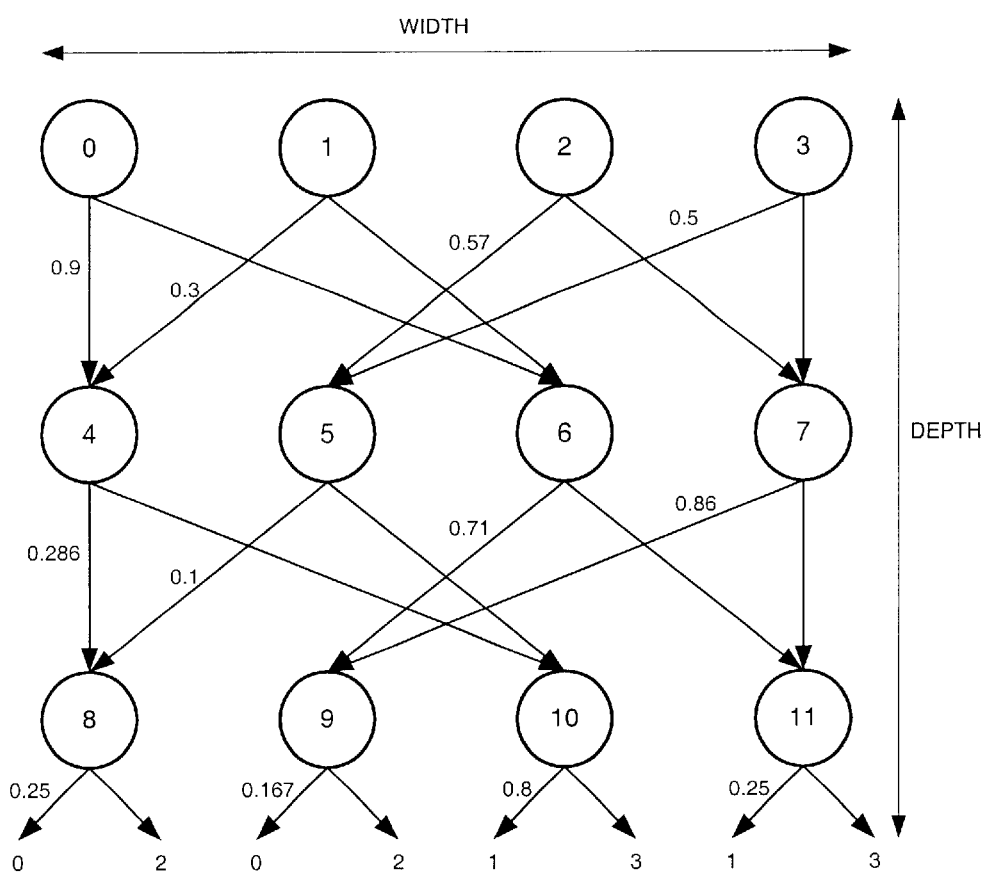
FIG. 6 is a table depicting an example of an encoding machine.
FIG. 7 is an illustration of a Markov model that is used for encoding the bits comprising an object code instruction.

Referring to FIG. 6, a simple encoder is depicted in order to illustrate the technique. The main variable is the size of the starting interval N, which in this case is 8. "MPS" or "M" denotes the Most Probable Symbol, while "LPS" or "L" denotes the Least Probable Symbol. Such machines have the following properties:

Property 1

All states are of the form $[k,N], k \leq N/2$. This ensures that at the end of a block (EOB), a minimum number of bits is required for padding to ensure unique decodability.

Property 2

A state $[k,N]$ is divided into two subintervals $[k,x)$ and $[x,N]$ corresponding to probabilities $(x-k)/N$ and $(N-x)/N$. However, not all possible $k+1 \leq x \leq N-1$ values of x are used. This is because for some values of x the resulting interval will not be of the form $[k,N]$, after expanding the interval around $N/2$.

Property 3

Assume a state of $[0,N]$. The next output symbol will be a "0" or "1", with equal probability. This is intuitively true as the encoder should produce output that is as random as possible. In other words, $p_0 = p_1 = 0.5$. However, this does not hold when the encoding is approximate, since the probability derived from the Markov model will not be matched exactly by the probability of the interval state machine and $p_0 \neq p_1$. This fact is used advantageously to reduce bit-toggling between subsequent words transferred from a memory device.

Property 4

Theoretically, the encoder can cycle indefinitely, without ever returning to state $[0,N]$. In fact, there exists an input sequence that will make it cycle indefinitely without producing any output. Consider the following case using the machine of FIG. 6: The encoder is at state $[2,8]$, the probability of the MPS is 5/6 and the MPS is the next input symbol. The machine will go to state $[3,8]$ and if the probability of the MPS is 3/5 and the next input bit is the LPS, the machine will return to $[0,8]$ from where it can reach $[2,8]$ if the MPS is always appears with no output, and can go through this cycle indefinitely if the Markov model and the input continue to have the same behavior. In practice, this does not happen since the Markov model and the input should match well and the LPS will always appear in state $[3,8]$.

Referring to FIG. 6, assuming that as the interval is divided, the upper interval corresponds to a 1 and the lower interval corresponds to a 0. The roles of these subintervals can be exchanged as the encoding progresses, as long as the codes generated are uniquely decodable. Herein the assignment of subintervals such that the higher interval corresponds to 1 as the regular assignment, and the inverse as the inverse assignment. Although exchanging the roles of the subintervals will only have an effect when encoding is approximate, which is controlled by N. As N becomes larger, the opportunity for bit-toggling reduction diminishes. On the other hand, since compression performance is better, fewer words need to be transferred from memory to the CPU. The preferred embodiment of the present invention keeps N small, because a large N will lead to large decoding tables, as will be described below.

In order to decide whether exchanging the roles of the subintervals is worth doing, the encoder looks at two issues: 1) the bit at the previously compressed word corresponding to the current bit position. Suppose we are going to store the next output at bit x of the current word. Bit x of the previously compressed word is used in conjunction with 2) the most probable output bit as derived by the Markov model and the machine in FIG. 6, to determine how to assign the subintervals. The rule to exchange is the following: If the Markov model and machine indicate that the next most probable output symbol (this exists due to approximations as explained in property 3 above) will be a "1" using the regular assignment and the previous word contains a "0" in the same position then the encoder will switch to the inverse assignment. Similarly, if the next high probability will generate a "0" and the corresponding bit in the previous word is a "1" the encoder will switch assignments.

FIG. 7 illustrates an exemplary Markov model, where the left branch is taken whenever the input bit is a "0" and a right branch is taken whenever the input bit is a "1". The probability of a "0" at each left branch, while the probability of a "1" can be easily derived by subtracting the probability of a "0" from "1".

Figure 8:
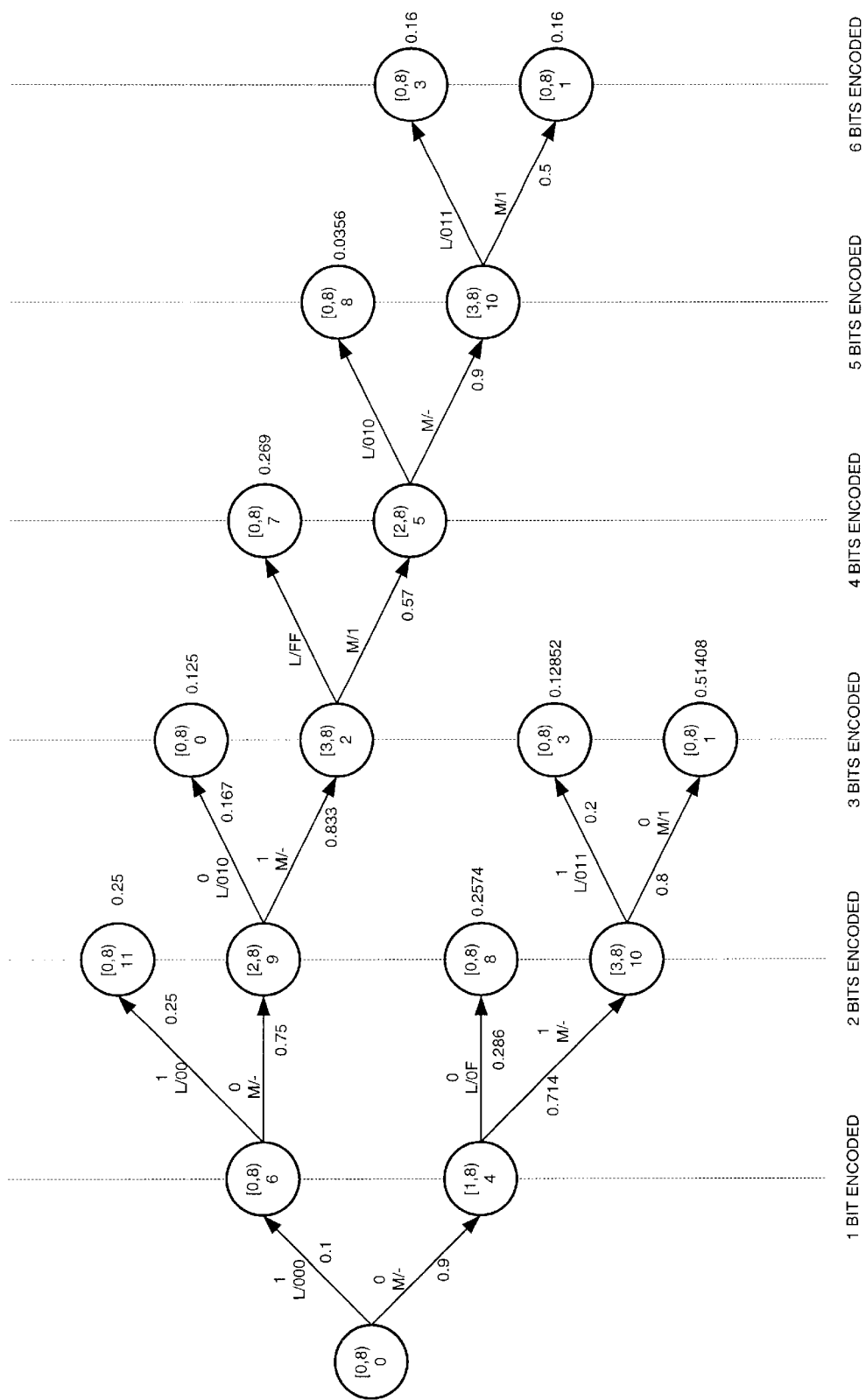
FIG. 8 illustrates an expanded state graph corresponding to the Markov model of FIG. 7.

Referring to FIG. 8, the expanded state graph was derived by following all possible paths starting at interval state [0,8) and Markov state 0 and traversing the example Markov model of FIG. 7 as each bit is encoded. Each node in FIG. 8 corresponds to a combination of an interval state and a Markov state. The numbers in the nodes show the corresponding interval and Markov state. Note that the final state is always the initial[0,8). FIG. 8 illustrates all possible outcomes for all possible inputs starting from[0,8) and ending back to[0,8). When the L symbol appears, [0,8) is reached only after one step from the starting node, encoding continues until [0,8) is reached for a second time. The result is the two subtrees shown in FIG. 8. Now assume that, in the previous compressed word at the same bit position, the bit was a "0". Regarding the subtree rooted at the starting node, it is advantageous to use the inverse assignment (a "1" will occur with probability 0.51408, i.e., there is an error of 0.01408 as opposed to 0.5 which is the value this probability should have). To ensure decodability though the entire above subtree branches have to be inverted. Regarding the second subtree, rooted at node [0,8), Markov state 6, it is not clear which is the next most probable output. Although, after reaching state[2,8), Markov state 5, a "1" will be output with probability 0.356 (MMM input path), the output from the MML path cannot be discerned, since the two bits to follow on transition from node [3,8), 2to [0,8), 7 can either produce 100 or 011 subsequently. It is therefore necessary to look further to find out what is the most probable output bit. As described above, Property 4 indicates that an endless search is a possibility, although in practice if the model is good the first output should arrive soon. Depending upon encodeer complexity, the user can choose whether or not to extend the expanded state graph.

For unique decodability, the following rules should be employed: 1) The expanded state graph's ending state has to be state [0,N),2); and 2) Once the encoder has switched to an assignment (regular or inverse), the encoder will remain in the new assignment until it has reached the expanded state graph's final state, which is always state [0,N).

These rules ensure that the decoder, using the same probability model, will be able to decode the sequence, since from the given probability it will know whether the encoder used the inverse or the regular assignment. Note that it is not necessarily the bit that is outputted from the MMM path is the most probable first bit of a sequence. If, for example in FIG. 8, the probability of the MMM path was less than 0.5, then although no other leaf would have a higher probability, the most probable first next symbol would be a "0". If also the previous word's bit was a "1", inversion may be desirable. Hence, inversion is not always done to according to the most probable path, but instead on the most probable next output symbol (due to approximations≠0).

Referring to FIG. 9, the pseudo-code for the algorithm for encoding one basic block will now be described. As mentioned above, the inverse flag will not change state unless the current interval state is [0,N). The number of output bits always shifts the variable mask in order to minimize the bit toggling between two identical bit positions of two subsequent compressed words. At the end of a basic block, if the final state is not [0,N), a "1" is output, plus any bits to follow leftover (This ensures unique decodability). These bits (End of Block bits, or BOB) are kept at a minimum by using states only of the form [k,N), k≦N/2. Finally, padding bits are inserted as necessary to ensure that the next block will start at a byte boundary.

Interval states and Markov states are combined into one state machine, which for each Markov and interval state, a number of possible matches is stored used to decode. This is why the preferred embodiment of the present inventions uses a small N. Otherwise, the resulting decoding table can be quite large. Note that in practice, since the preferred embodiment uses Markov models that are aligned with the instruction size, not all combinations of interval and Markov states occur in practice. This table is generated during the encoding phase. The inverted bits are stored instead of the original whenever the encoder decides to switch assignment. The most important point here is that the inversion comes at no cost. The decoding table is about the same size, and is capable of producing exactly the same bits per cycle. Thus reducing bit toggles can be done without any loss of performance.

Using the graph in FIG. 8, the decoding table entries as shown in FIG. 10 can be derived. This essentially stores all possible outputs for all possible inputs, and thus can be used to decode. A simpler decoder would just use the original table and the Markov model. However, this arrangement would only decode one bit per cycle. It is also possible to store a subset of all possible paths. By carrying out the comparisons in parallel (in practice we store the length of the matches as well), selection of the correct match is accomplished in one cycle. FIG. 10 shows two entries, one for each subtree of the expanded state graph of FIG. 8. Another problem that has to solved is that the decompression engine has to know when to invert the matches. This implies that it must use the previous compressed word. Note that this means spatially previous and not temporally previous. But checking the corresponding previous bit and by checking what is the most probable output bit, stored in the entry, the decompression engine can determine whether to invert or not. This is stored in the table as the MPOS symbol which tells the decoder what is the most probable output symbol, e.g., since the Markov model has been integrated in the table, it cannot be derived as was done during encoding. The arrows in the table show the matches after inversion. Note that only the bits that correspond to the first subtree of FIG. 8 are inverted.

Figures 11A, 11B, 11C, 11D, 11E:
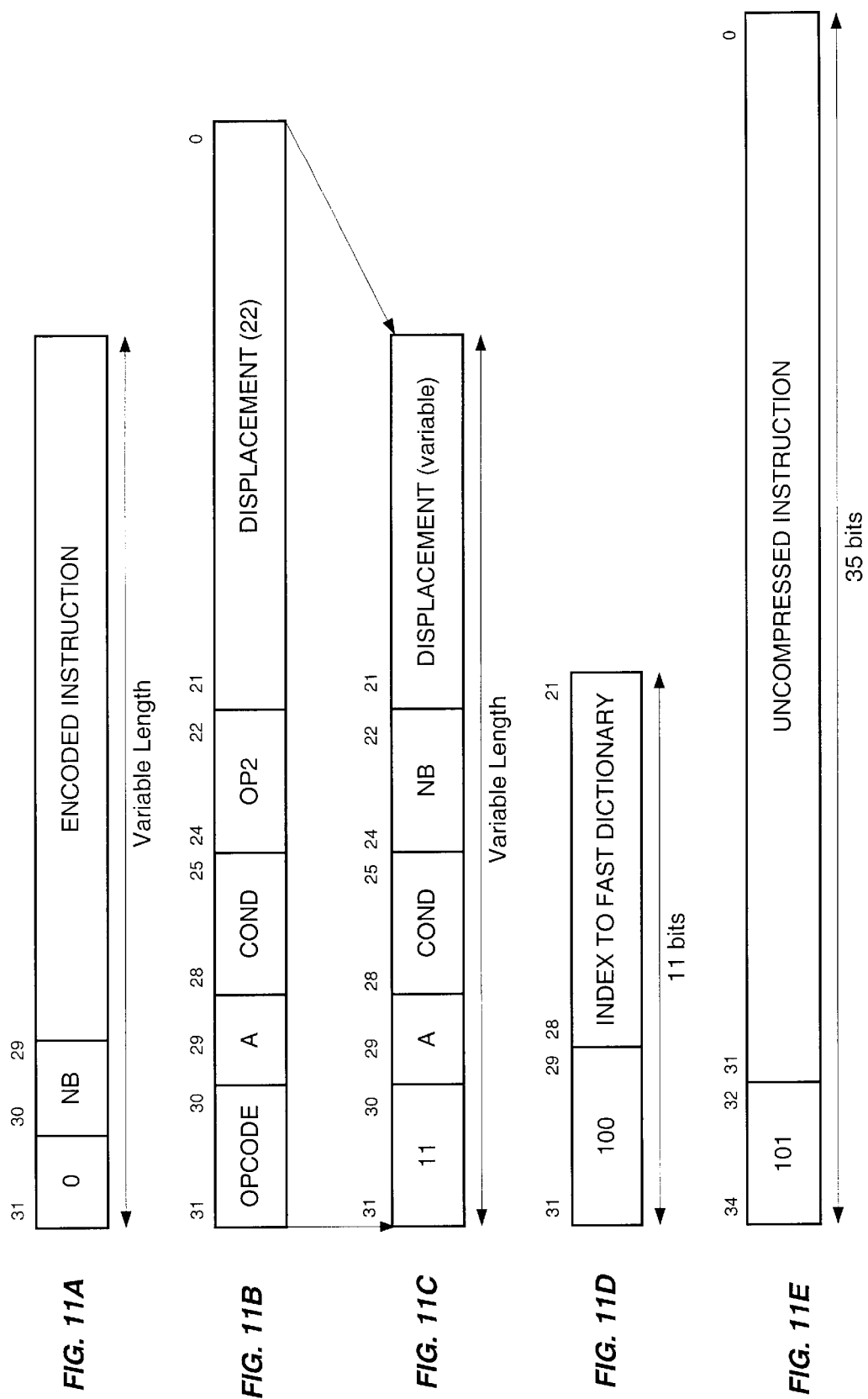
FIGS. 11A, 11B, 11C, 11D, and 11E depict the final composition of several types of compressed object code instructions, according to an embodiment of the present invention.

The actual compression format of the class 1, class 2, class 3 and class 4 instructions will now be discussed in greater detail. As defined earlier, class 1 instructions are those uncompressed object code instructions that have an immediate field. These are uncompressed object code instructions that are not branch instructions, call instructions or sethi instructions (SPARC instruction that sets the higher order bits of a register). Referring to FIG. 11A, a compressed class 1 instruction is appended with a 1-bit code set to "0"

which instructs the decompression engine to use the appropriate decoding table. The remaining bits of the compressed object code instruction are the encoded instruction that has been encoded according to the mathematical model derived earlier. After the lead-off "0" bit, two more bits are used to count the total number of bytes (including these bits) that the compressed object code instruction occupies. This facilitates decoding and enables pipelining the design. Although in FIG. 11A illustrates a compressed object code instruction having a length of twenty-five bits, the size of the compressed instruction will vary depending upon the mathematical model used for compression. In FIG. 11A, three bits are used for instruction identification and sizing, and the remaining twenty-two bits comprise the compressed instruction. The number of bits in the compressed instruction will vary depending upon the instruction itself and the mathematical compression model.

Referring to FIGS. 11B–11C, class 2 instructions are those uncompressed object code instructions that consist of branch instructions, call instructions and sethi instructions. As shown in FIG. 11B, the uncompressed branching instruction is composed of operational codes, a branch annulling bit, a set of conditional bits and a displacement index to the branching instruction location. Typically, the branch-annulling bit indicates that the next instruction is not executed. As described earlier, while the preferred embodiment of the present invention uses the SPARC instruction set, the present invention is applicable to all instruction sets.

Referring to FIG. 11C, a two-bit code "11" is appended to the beginning of the compressed branching instruction to indicate to the decompression engine that this instruction is a branching instruction. The branch-annulling bit (A) is copied into the next bit. Following the branch annulling bit, the four conditional bits (COND) are copied into the compressed instruction. As shown in FIG. 11C, the number of address displacement bits (NB) is encoded using four bits. Using four bits allows address displacements up to sixteen bits in width that are adequate for most compressed applications. The remaining bits are the address displacement bits that can vary from 1 to 16 in length. These address displacement bits will point to byte-addressable (unaligned) memory locations. As it is impossible to determine beforehand how much the branching object code instruction will compress, the number of address displacement bits is conservative (i.e., wasting some address displacement bits), and is derived during the compression of the object code instructions that are non-branching instructions.

As defined earlier, class 3 instructions are those instructions that lack any immediate fields, thereby allowing their compression directly into a single byte that is used as an index into a decompression table. Decompression speeds up considerably, since for these compressed object code instructions, only one table lookup is necessary. This type of compressed instruction is herein referred to as "fast dictionary instructions." Referring to FIG. 11D, the three bit code "100" is appended onto the beginning of the compressed instruction and is used by the decompression engine to differentiate these compressed instructions from the other compressed object code instructions. Fast dictionary instructions will compress to eleven bits, as only the code "100" and the single byte comprise the compressed instruction.

As defined earlier, class 4 instructions are those object code instructions that have immediate fields, are not branch instructions or call instructions, and cannot be compressed. These uncompressible object code instructions are rare, and are left intact. Referring to FIG. 11E, these object code instructions require no decompression, while the three-bit "101" is appended to the beginning of the object code instruction, thereby allowing the decompression engine to differentiate these object code instructions from the other compressed object code instructions. Thus, as shown in FIG. 11E, the final object code instruction will be thirty-five bits wide, as opposed to the original thirty-two bits.

Obviously, these bit constructions are effected while the object code instructions are being compressed. Of course, while the preferred embodiment uses the previously described bit constructions for the compressed object code instructions, the compressed instruction format is not limited to the codes and bit alignments described herein. It is assumed that equivalent bit arrangements can be employed which achieving the identical objectives of the present invention.

Figure 12A:
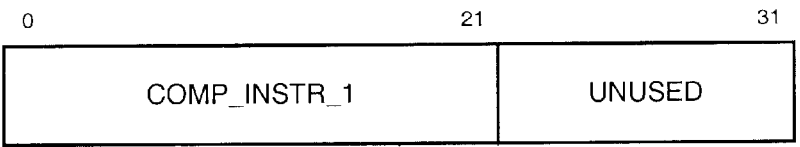
FIGS. 12A, 12B, and 12C illustrate the sequential transmission of unpacked compressed object code instructions over an instruction/data bus wherein certain bits from previous compressed object code instructions are not toggled.
Figure 12B:
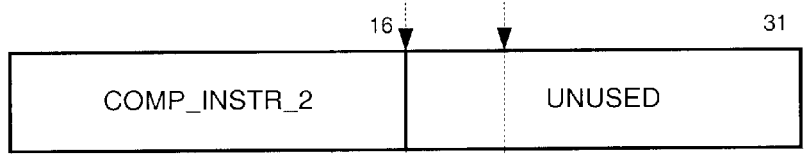
Figure 12C:
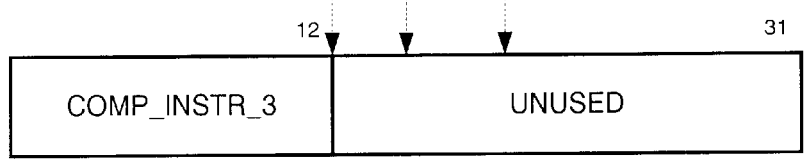

FIGS. 12A–12C depicts the conventional technique of passing one compressed object code instruction per bus transmission. Since compressed instructions typically occupy less than thirty-two bits (the notable exception being the class 4 instructions), each instruction fetch across the bus will have a number of leftover bits that are unused. Typically, the leftover bits are retransmitted across the bus with the fetched compressed instruction, such that they are the identical as the previous transaction. As shown in FIGS. 12A–12B, bits 17–21 of COMP_INSTR_1 are replicated in the bus transmission of COMP_INSTR_2. As shown in FIGS. 12B–12C, bits 13–16 of COMP_INSTR_2 are replicated in the bus transmission of COMP_INSTR_3. Of course, bits 17–21 of COMP_INSTR_1 are replicated as bits 17–21 appended to COMP_INSTR_3 when COMP_INSTR_3 is transmitted across the bus, as well as bits 13–16 of COMP_INSTR_2. This technique minimizes bit toggling, since the number of bits that transition is at most equal to the size of the new compressed instruction transmitted across the bus. In terms of power consumption, bit toggling is reduced, but the total number of instruction fetches remains identical to the case where there is no instruction compression.

Figure 13A:
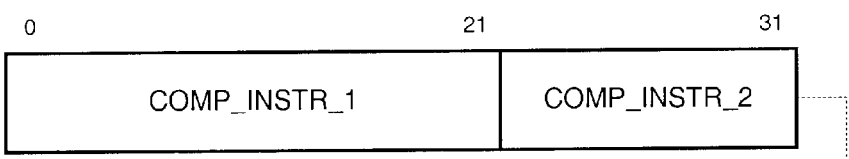
FIGS. 13A and 13B illustrate the packing of compressed object code instructions to reduce the number of bus cycles necessary to transmit compressed object code instructions from storage to the decompression engine, according to an embodiment of the present invention.
Figure 13B:
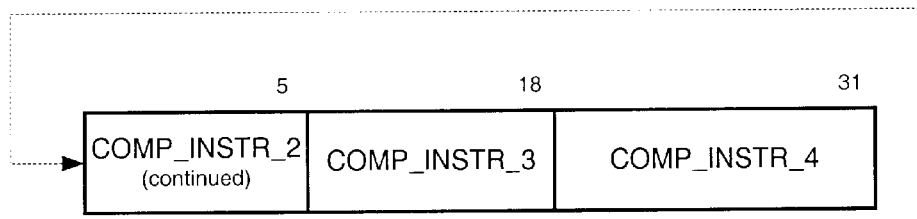

The present invention increases bandwidth across the bus by transmitting bits that belong to the next compressed instruction. FIGS. 13A–13B illustrates this approach. The bits remaining in the 32-bit word after COMP_INSTR_1 is loaded into the memory location are filled with the next instruction COMP_INSTR_2. As shown in FIGS. 13A–13B, all the bits of COMP_INSTR_2 do not fit within the thirty-two bits available and thus the remaining bits are loaded into the second memory word. This process is repeated multiple times, and thereby achieves the object of reducing the amount of power-consuming memory that is required. Note that it is useful to compact more than one instruction in one 32-bit word only when the next compressed instruction is the next one also in terms of memory location. Whenever a compressed branch or a call is fetched from the memory storage, the leftover bits will be useless, as they will not be part of the instruction to be executed. The present invention does not reduce bit toggling, but it does reduce the total number of memory accesses, and thus the total energy consumed. This memory compaction technique is not a necessary component of the present invention, although greater savings in energy consumption are achieved by closely packing the compressed object code instructions.

Figure 14:
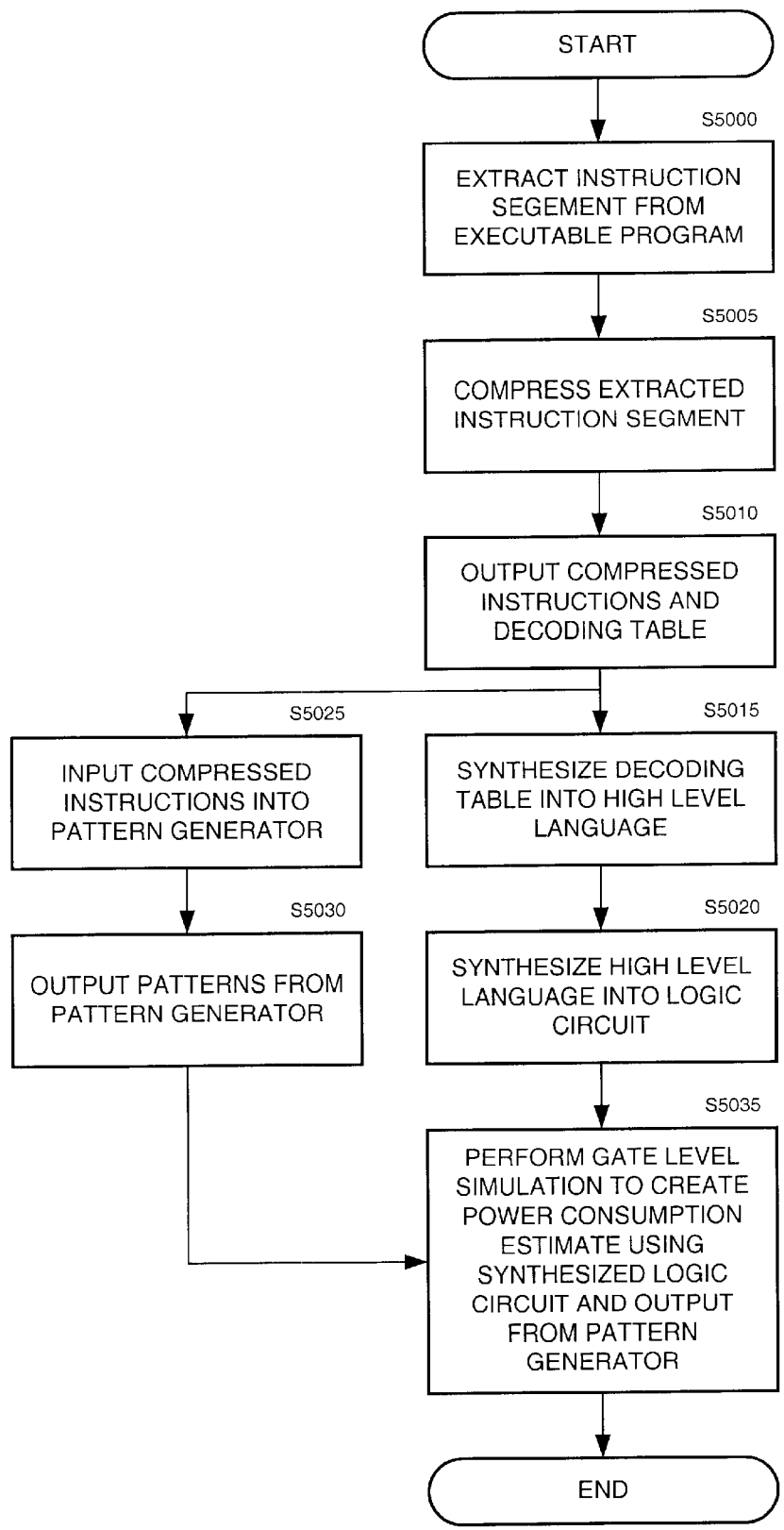
FIG. 14 illustrates a method for estimating the energy consumption level of compressed object code instructions.

Referring to FIG. 14, a process flow for testing the decompression engine is illustrated. In Step S5000, an instruction segment of the executable program is first extracted, which is subsequently compressed by the code compressor in Step S5005. The output of the compressor is the compressed instruction segment and a decoding table, which is output by Step S5010. A software language called BDL, a C-like high-level language to describe the behavior of the decompression engine. Since each application will have its own decoding table, the decompression engine is designed to work well only on a specific application. In Steps S5015 and S5020, the decoding table and the BDL program are synthesized into VHDL code by the high-level synthesis tool CYBER, and the resulting code is then synthesized to logic using SYNOPSYS design compiler. In Step S5035, OPENCAD's gate-level simulation tool can be used to get a power consumption estimate. In Steps S5025–S5030, the input patterns to the OPENCAD tool are the compressed instructions that have to be decompressed. The compressed instructions are input into a pattern generator and the pattern generator outputs the compressed instructions to the OPENCAD tool to obtain a power consumption estimate. Of course, other software tools can be used to accomplish the testing of the power consumption of the compressed object code instructions.

Figure 15:
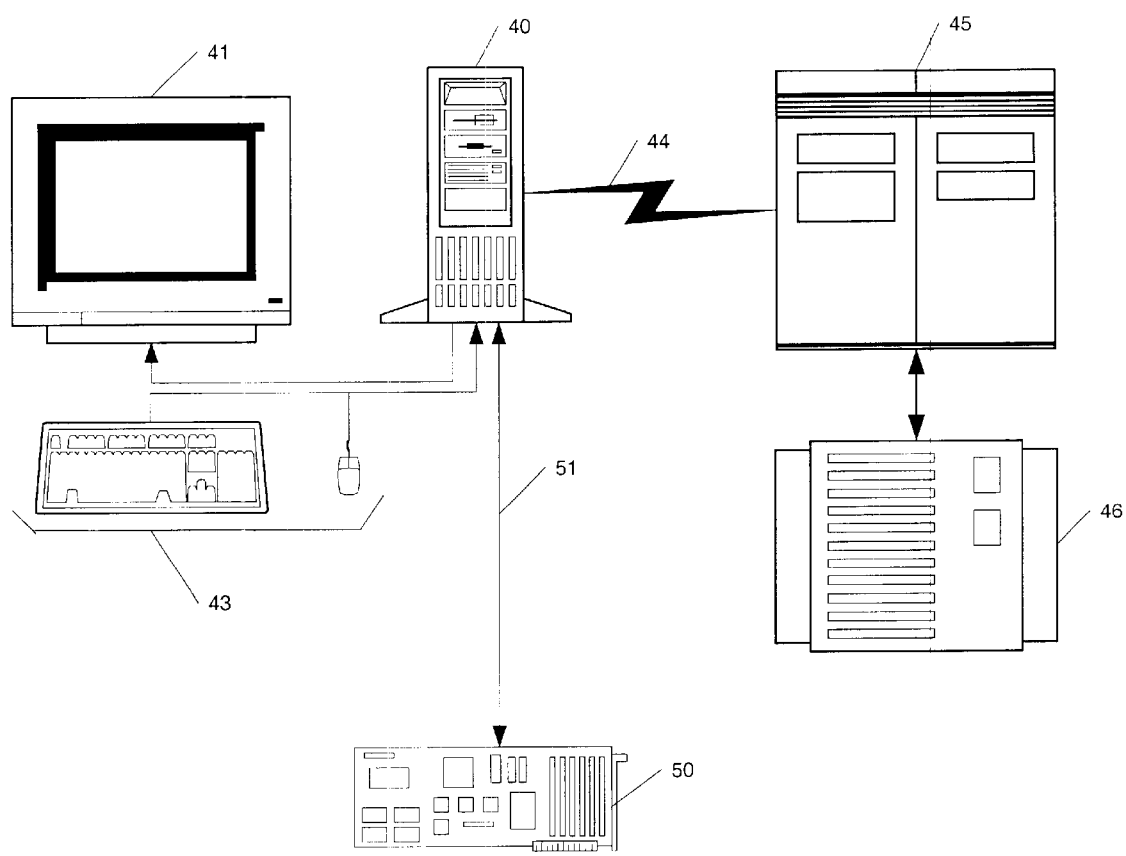
FIG. 15 illustrates a computer system embodiment that is adapted to compress object code instructions of an executable program for an embedded computer.

A second embodiment of the present invention will now be discussed. Referring to FIG. 15, an embodiment of a computer system is depicted, including a processor 40, I/O devices 43 and a video display terminal 41. The I/O devices 43 include, but are not limited to, a keyboard and a mouse. Other devices, such as touchpads, can also be used. The computer system further includes a memory 42 (not shown but incorporated in the processor 40) including software instructions adapted to enable the computer system to perform the steps of the invention as described.

The computer system can also incorporate a server 45, connected to the processor 40 by a data link 44. The data link 44 is a conventional data link (e.g., Ethernet, twisted pair, FTP, HTTP, etc.). The server 45 provides access to the program libraries 46 connected to the server. The program libraries 46 can also provide software instructions adapted to enable the computer system to perform the steps of the invention. As described above, the program libraries 46 may be embodied on any number of different mediums (e.g., floppy disk, hard disk, optical disk, cartridge, tape, CD-ROM, writable CD, etc.) as are known in the art. In the computer system illustrated in FIG. 15, the software instructions on the memory 42 allow the processor 40 to access the server 45 via the data link 44, thereby providing access to the program libraries 46. The computer system illustrated in FIG. 15 is not intended to be limiting in any way, as the skilled artisan can construct a vast number of different computer system embodiments that implement the invention.

A computer system adapted to compressing uncompressed object code instructions from an executable program for an embedded computer will now be discussed in greater detail. As described above, the computer system includes a processor 40 for executing software instructions adapted to enable the computer to perform the steps of the present invention such that uncompressed object code instructions are compressed to reduce power consumption. The computer system includes a memory 42 (not shown) that stores the software instructions adapted to enable the computer system to perform the steps the present invention. As described above, these software instructions can be resident on the computer system or on the server 45 connected to the computer system across the data link 44.

First of all, the computer system decomposes the uncompressed object code instructions into at least four predetermined instruction classes. These instruction classes are the instruction classes that were described above, e.g., instruction classes 1–4. Following the decomposition of the uncompressed object code instructions, the computer system excludes certain uncompressed object code instructions in order to derive a mathematical model to use for compressing predetermined uncompressed object code instructions. Again, this exclusionary process is the same as described above, with certain instructions being excluded for use in the mathematical model due to their characteristics. The computer system uses uncompressed object code instructions that are suitable for the mathematical model to thereby derive the mathematical model that is used for compression and decompression.

Next, the computer system compresses uncompressed object code instructions from at least one of the predetermined instruction classes. The computer system uses the previously derived mathematical model to compress the object code instruction types that were previously culled from all the object code instructions comprising the executable program.

Following the compression of the object code instructions, a decoding table is constructed for decompressing the compressed object code instructions in accordance with the derived mathematical model. Following the compression of certain object code instructions, the computer system compresses object code instructions from a different instruction class. During the compression of the object code instructions, address offsets are added to each object code instruction following its compression. These address offsets are used by certain compressed instructions to point into compressed address space. Following the compression of all the object code instructions that can be compressed, the computer system patches the address offsets that were earlier added to certain instructions. This patching is due to the migration of the address offsets as the instruction addressing space shrinks during the compression of the object code instructions.

Referring to FIG. 15, the compressed code is downloaded into an embedded computer system 50 over a data link 51. The embedded computer system 50 is of the type previously described, e.g., a personal digital assistant, a cellular telephone, etc. The embedded computer system 50 can even be part of a device that is inserted into a more conventional computer, e.g., a desktop or rack-mounted computer.

Following the compression of the uncompressed object code instructions, the computer system downloads the compressed code into a memory (not shown) resident on the embedded computer system 50. The computer system can permanently write the compressed code into the memory, e.g., ROM or flash memory, or the computer system can dynamically interface with the embedded computer system 50 by downloading the compressed code into a random access memory, and then debugging the compressed code.

A third embodiment of the present invention will now be discussed. The present invention may be embodied on a computer program product for enabling a computer system to compress uncompressed object code instructions from an executable program for an embedded computer. The software instructions that enable the computer system to perform predetermined operations as required by the present invention are borne on a computer readable medium.

First of all, the software instructions command the computer system to decompose the uncompressed object code instructions into at least four predetermined instruction classes. These instruction classes are the instruction classes that were described above, e.g., instruction classes 1–4. Following the decomposition of the uncompressed object code instructions, the software instructions command the computer system to exclude certain uncompressed object code instructions in order to derive a mathematical model to use for compressing predetermined uncompressed object code instructions. Again, this exclusionary process is the same as described above, with certain instructions being excluded for use in the mathematical model due to their characteristics. The software instructions command the computer system to use uncompressed software instructions that are suitable for the mathematical model to thereby derive the mathematical model that is used for compression and decompression.

Next, the software instructions command the computer system to compress uncompressed object code instructions from at least one of the predetermined instruction classes. The software instructions command the computer system to use the previously derived mathematical model to compress the object code instruction types that were previously culled from all the object code instructions comprising the executable program.

Following the compression of the object code instructions, a decoding table is constructed for decompressing the compressed object code instructions in accordance with the derived mathematical model. Following the compression of certain object code instructions, the software instructions command the computer system to compress object code instructions from a different instruction class. During the compression of the object code instructions, the software instructions command the computer system to add address offsets to each object code instruction following its compression. These address offsets are used by certain compressed instructions to point into compressed address space.

Following the compression of all the object code instructions that can be compressed, the software instructions command the computer system to patch the address offsets that were earlier added to certain instructions. This patching is required due to the migration of the address offsets as the instruction addressing space shrinks during the compression of the object code instructions.

Figure 16:
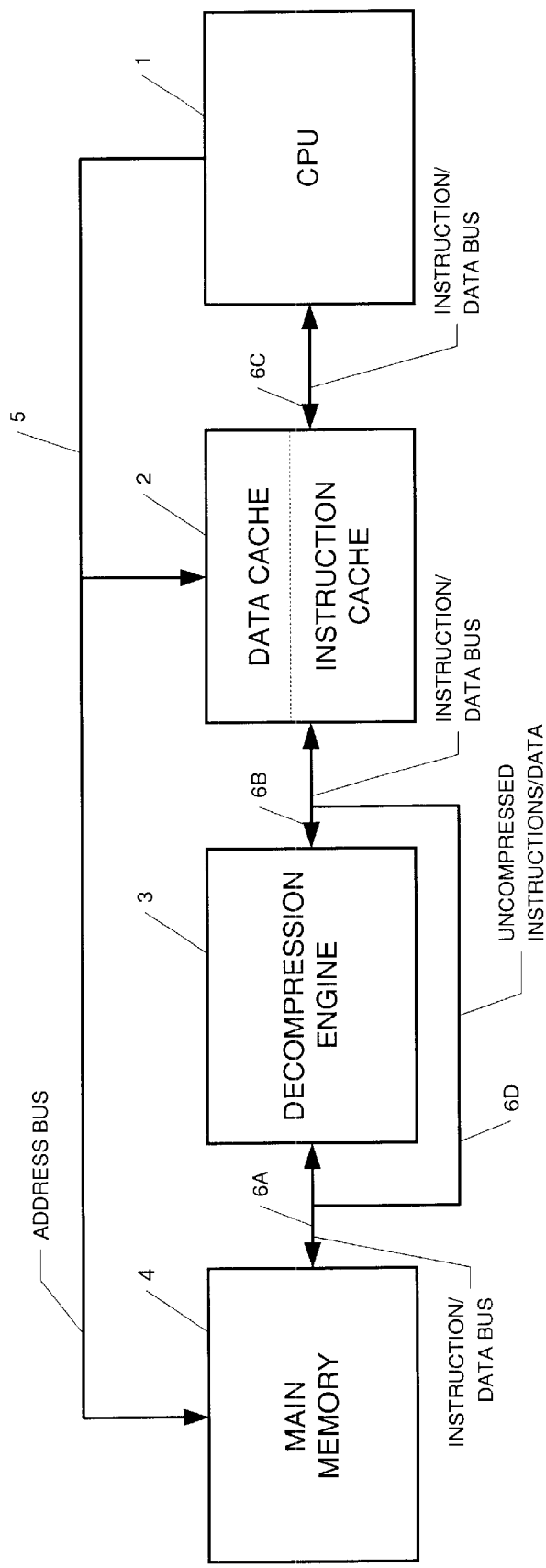
FIG. 16 illustrates a conventional arrangement of hardware components in a computer system that uses a decompression engine.

Referring to FIG. 16, a conventional apparatus that decompresses compressed object code instructions is illustrated. The central processing unit 1 accesses the main memory 4 and the instruction/data cache 2 via the address bus 5 and an instruction/data bus 6A–6D. The main memory 4 can comprise read-only memory, random access memory, flash memory or a combination thereof. The main memory 4 is interconnected to the conventional decompression engine 3 via instruction/data bus 6A. For uncompressed instructions and/or data, instruction/data bus 6D provides a bypass around decompression engine 3. Uncompressed object code instructions output by the decompression engine 3 reach the instruction/data cache 2 via the instruction/data bus 6B. Data and instructions are swapped between the central processing unit 1 and the instruction/data cache 2 via the instruction/data bus 6C. As illustrated, if the decompression engine 3 resides between the cache 2 and the main memory 4, the advantages of compression affect only the instruction/data bus 6A between the main memory 4 and the cache 2. The decompression engine 3 can utilize the bits from the next cache line, with the proviso that the central processing unit 1 is requesting that particular cache line next. Note that if the cache line size is greater than 32 bits, and since compaction can only take place at the end of the compressed cache line, i.e., only after a number of cycles, compaction will not be as effective as in the instruction-by-instruction compression case.

Figure 17:
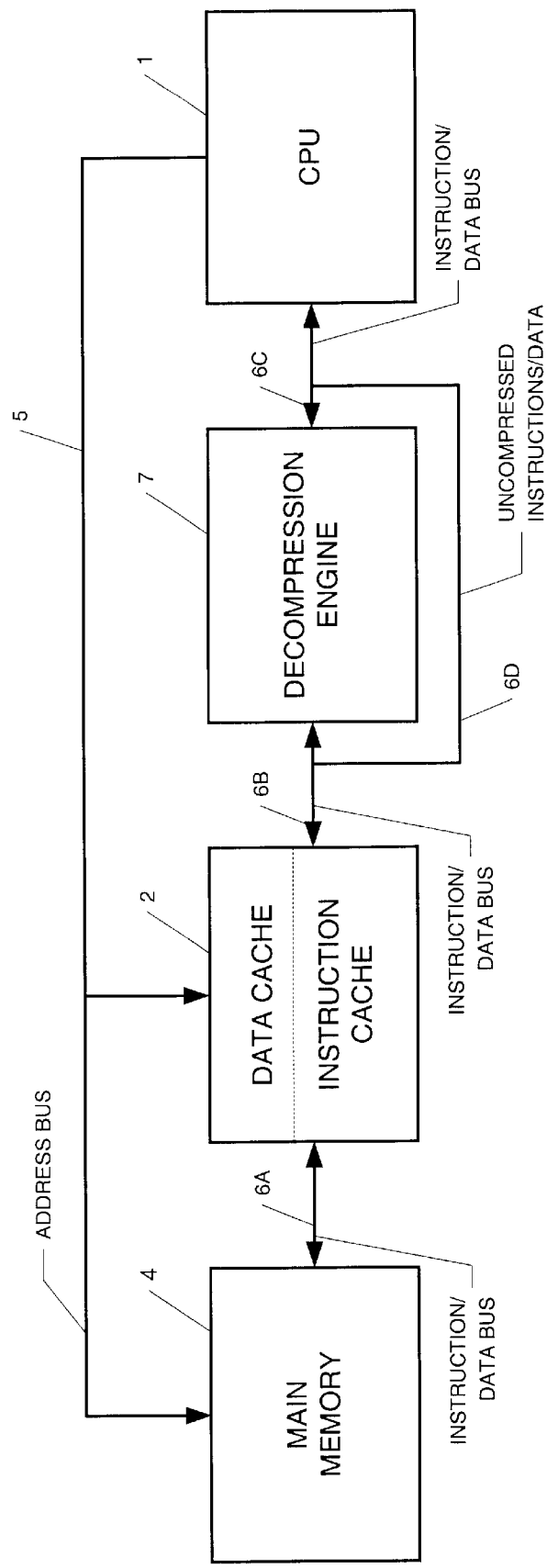
FIG. 17 illustrates a first embodiment of a computer system that uses the present invention to reduce power consumption by interposing the decompression engine between the instruction/data cache and the central processing unit.

Referring to FIG. 17, a fourth embodiment of the present invention will now be described. In a post-cache architecture, the decompression engine 7 is now interposed between the instruction/data cache 2 and the central processing unit 1. Obviously, in the post-cache architecture, the instruction/data bus profits from the compressed object code instruction since the object code instructions are only decompressed by the decompression engine 7 before they are fed into the central processing unit 1, whereas in the pre-cache architecture, only the instruction/data bus between the main memory 4 and the instruction/data cache 2 profits from the compressed object code instructions.

All the architectures finally arrive at a point of saturation, i.e., a point where the number of bit toggles does not increase any more since the number of cache hits reach a maximum level. The post-cache architecture presents the following advantages over a pre-cache architecture:

1) The "saturation point" is reached earlier in case of the post-cache architecture (i.e., 512 bytes) as opposed to 1024 bytes in case of the pre-cache architecture and no compression. In other words, the post-cache architecture effectively creates a larger cache. The present invention allows a low-power embedded computer system to utilize a cache that is only half the size of the cache required for a precache architecture embedded computer system, without any loss of performance. Of course, if the system designer so desires, the instruction/data cache size does not have to be reduced and there is a tangible performance gain. However, if the system designer does not require this increased performance, then the performance gain can be traded against energy/power consumption by slowing down the clock frequency, for example.

Assuming the decompression engine can decode at a rate that does not impose a penalty on the central processing unit, the performance advantage of the post-cache architecture is more significant since the instruction/data bus connecting the instruction cache and the central processing unit will have increased bandwidth. A pre-cache architecture will only benefit on a cache miss. Furthermore, as opposed to an embedded computer architecture that does not use object code compression, the instruction cache is effectively larger since it holds compressed object code. As a consequence, instruction cache misses occur less often and thus the embedded computer's overall performance increases. A post-cache architecture would have no cache miss ratio improvement. It should be noted though, that a post-cache decompression engine requires more careful and area-expensive design to match the central processing unit's speed than a pre-cache architecture would. This is because, in a pre-cache architecture, it is easier to hide decompression penalties since memory access time is much longer than cache access time.

2) The number of toggle counts is the lowest for post-cache at a given instruction cache size for reasonable sizes (a "reasonable" cache size is one where the saturation point, as described above, has been reached; it provides a good compromise between cache size and number of cache misses). Thus, the post-cache architecture seems most energy efficient.

3) The number of toggles is for all instruction cache sizes smaller in case of post-cache architecture than in the pre-cache architecture with no object code instruction compression. The larger effective cache size (as discussed above) causes less cache misses and hence less traffic (this relates to bit toggles) through the instruction/data bus 6A–6D.

In all reasonable instruction cache configurations, post-cache architecture gives the lowest amount of bit toggles while the pre-cache architecture is actually better or almost equal to no object code instruction compression in all cases.

Please note that an instruction cache size of 128 bytes does not represent a "reasonable" size since it would offer a too low performance. Only for unreasonable instruction cache sizes there is an advantage for architecture pre-cache architecture over post-cache architecture for instructions passed over the instruction/data bus.

4) Referring to FIG. 17, the main memory can be made smaller since less space is required for holding the compressed object code instructions. This reduction in memory size results in a reduction in energy consumption for each access to the main memory since the effective capacitance is smaller (the effective capacitance is a function of the memory size). As for the instruction/data bus 6A–6D, the energy consumption also shrinks since fewer instruction bits (of the compressed object code instructions) are sent via the instruction/data bus and thus cause less bus toggles. Likewise, the cache energy consumption also shrinks. Finally, even the energy consumption of the central processing unit decreases since the application now executes faster (fewer instruction cache misses).

An third option is to modify the decoding unit of the central processing unit to decode compressed object code instructions. Although this modification would not require a separate decompression engine, its main disadvantage is that it requires new software development tools, such as compilers to handle an essentially new instruction set. Furthermore, modifying the central processing unit incurs additional design overhead.

Figure 18:
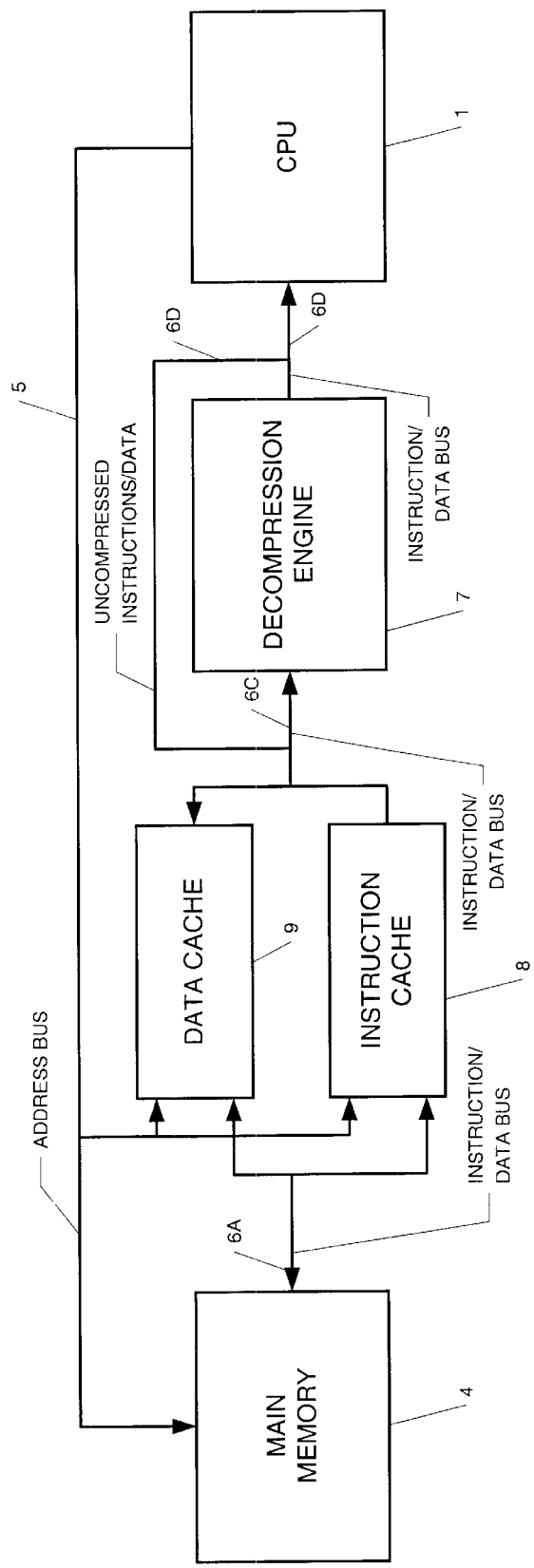
FIG. 18 illustrates a second embodiment of a computer system that uses the present invention to reduce power consumption by interposing the decompression engine between the instruction/data cache and the central processing unit.

Referring to FIG. 18, a fifth embodiment of the present invention is illustrated. The cache has been physically separated into an instruction cache 9 and a data cache 8. Aside from having physically separate caches, this embodiment operates in an identical manner to the previously described fourth embodiment.

As described previously, the preferred embodiment of the compression method divides the uncompressed object code instructions into four separate classes (class 1–class 4). Compressed object code instruction from class 1 will generally take much longer to decompress that compressed object code instructions from class 2, class 3 or class 4 because the decompression engine will only decompress six to eight bits of a compressed object code instruction per cycle. Since class 1 instructions cause bottlenecks, the decompression engine of the present invention does not block subsequent compressed object code instructions from being decompressed while a class 1 instruction is being decompressed.

Figure 19:
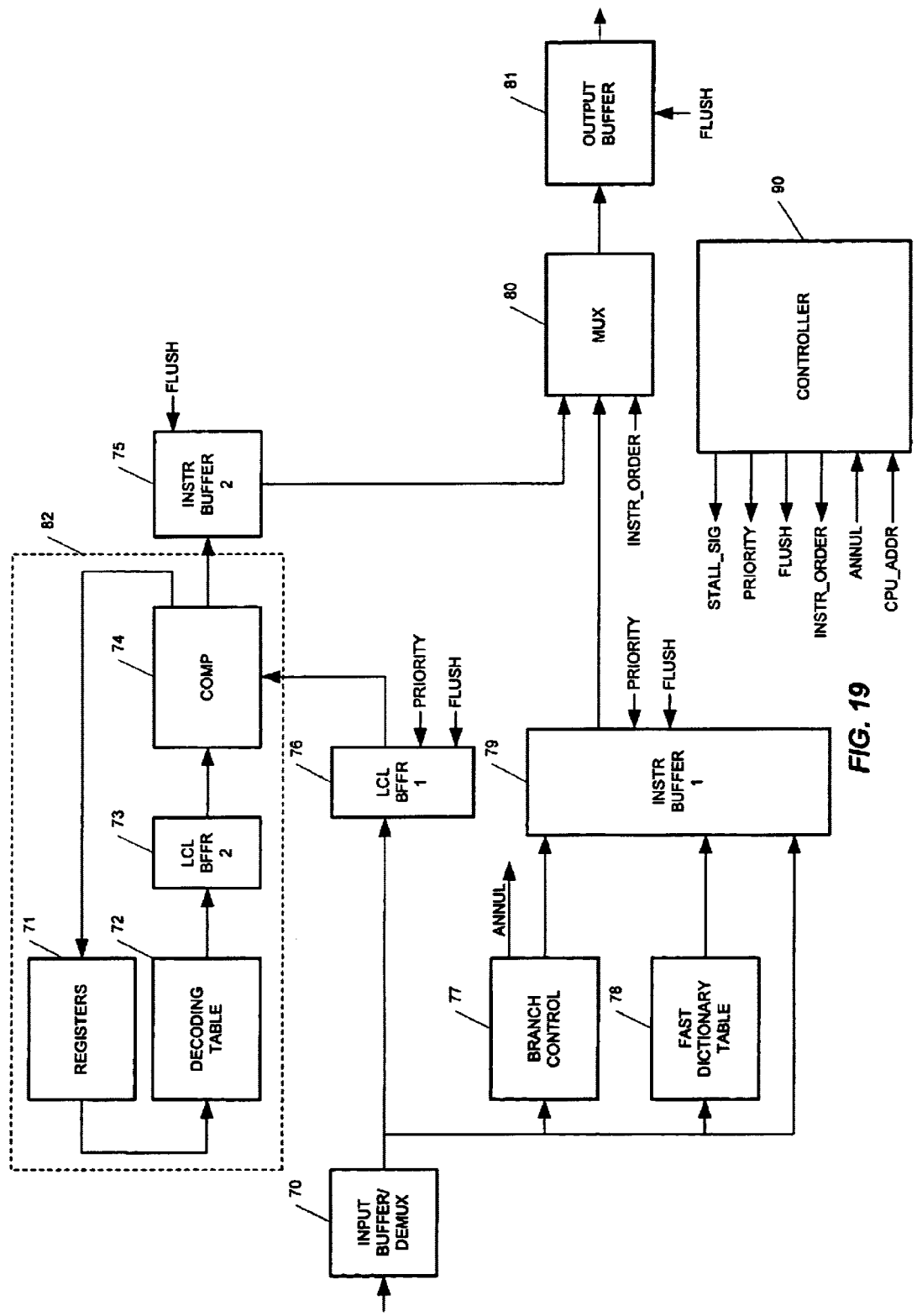
FIG. 19 illustrates an embodiment of a decompression engine for the decompression of compressed object code instructions according to the present invention.
Figure 20:
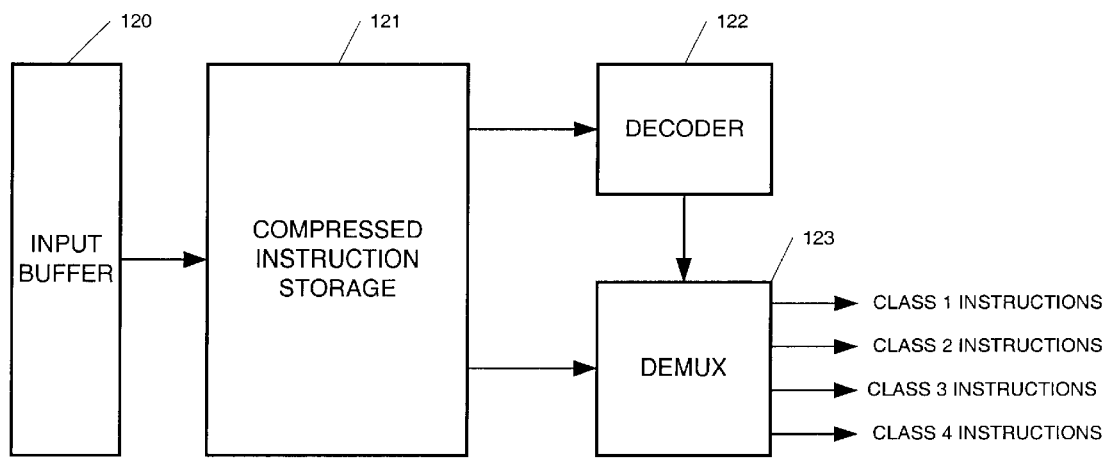
FIG. 20 illustrates the input buffer portion of the decompression engine embodiment.

Referring to FIG. 19, a block diagram of an embodiment of the decompression engine according to the present invention is illustrated. As described earlier, the uncompressed object code instructions are separated into four classes in the preferred embodiment of the compression method. Compressed object code instructions accumulate in the input buffer circuit 70. Compressed object code instructions are retrieved from the instruction cache. In the preferred embodiment for the decompression engine, in each cycle, thirty-two bits of compressed object code instructions are written into the input buffer circuit 70. As should be clear, these compressed thirty-two bits can correspond to anything from a portion of a compressed object code instruction up to multiple uncompressed object code instructions. During the first stage of decompression, the decompression engine reads the tag bits appended to the beginning of each compressed object code instruction (See FIGS. 11A–11E), and the compressed object code instructions are sent to the appropriate paths. The input buffer circuit 70 routes a compressed object code instruction once it has been properly identified. The input buffer circuit 70 will use the tag bits to identify the instruction and to determine how many bytes it comprises. The input buffer circuit 70 is needed, because in some cases, there will not be a whole instruction for the decoder to determine its path, and the 32 bits must be stored until the next cycle when the rest of the compressed object code instruction will arrive. Usually, a class 4 instruction (uncompressible and thirty-five bits long) causes this situation. Another reason for having the input buffer circuit 70 is that if the pipeline (where class 1 instructions go through multiple times to be decompressed) is full, if more class 1 compressed object code instructions arrive from the instruction cache, they must be buffered until there is an empty slot in the pipeline.

In each of the four classes of compressed object code instructions, the input buffer circuit 70 routes the compressed object code instructions to one of four circuits based upon the tag bits. In the preferred embodiment of the decompression engine, a first local buffer circuit 76 receives class 1 instructions. The first local buffer circuit 76 buffers compressed object code instructions prior to being decoded by the decoding engine 82. The branch control circuit 77 receives class 2 instructions, and the fast dictionary table circuit 78 receives class 3 instructions. The output from the branch control circuit 77 and the fast dictionary table circuit 78 are routed to a first instruction buffer circuit 79. Uncompressed object code instructions are routed directly to the first instruction buffer circuit 79. Note that class 2, class 3 and class 4 instructions always write thirty-two bits (one decoded instruction) to the first instruction buffer circuit 79.

If the compressed object code instruction is a class 1 instruction, the input buffer circuit 70 writes the compressed object code instruction to the first local buffer 76 after stripping off the tag bits. The decoding engine 82 receives compressed object code instructions from the first local buffer 76. After decompression, the decoding engine 82 outputs the decompressed object code instructions to a second instruction buffer circuit 75 after undergoing decompression using the mathematical model derived by the preferred embodiment of the compression method. Note that these decompressed object code instructions are written to the second instruction buffer circuit 75 in six-to-eight bit pieces. In the preferred embodiment of the decompression engine, the second instruction buffer circuit 75 has enough capacity to handle many thirty-two bit instructions (must be able to handle up to four which the depth of the pipeline) since up to four instructions can be decompressed at the same time.

If the compressed object code instruction is a class 2 instruction, the input buffer circuit 70 writes the compressed object code instruction to the branch control circuit 78 after stripping off the tag bits. The branch control circuit 77 uses the number of bits to determine the number of bits that comprise the sixteen bits that point to byte-addressable (unaligned) memory locations. The branch control circuit is also known as the second decoding circuit. The branch control circuit 77 uses the number of displacement bits to rearrange the bits and pads all necessary zero's to form the original branch instruction. After the branch control circuit 78 decodes the branching instruction, the uncompressed object code instruction is routed to the first instruction buffer circuit 79.

If the compressed object code instruction is a class 3 instruction, the input buffer circuit 70 writes the compressed object code instruction to the fast dictionary table circuit 78 after stripping off the tag bits. The fast dictionary table circuit 78 is also known as the first decoding circuit. The fast dictionary table circuit 78 contains read-only memory, although other types of nonvolatile memory could be used. The memory of the fast dictionary table circuit 78 contains the decoding table created from the class 3 instructions. This decoding table is created during the compression of the object code instructions. The byte that follows the tag bits in this type of compressed object code instruction is used as an index to address a 256 entry table storing decompressed instructions. This pipeline is capable of writing more than one instruction per cycle, since some frequently appearing instructions without an immediate field appear in pairs, and are compressed using only one byte. The uncompressed object code instruction is output from the memory to the first instruction buffer circuit 79.

If the compressed object code instruction is a class 4 instruction, the input buffer circuit 70 writes the compressed object code instruction to the first instruction buffer circuit 79 after stripping off the tag bits. No further decompression of this instruction class is necessary.

The first instruction buffer circuit 79 and the second instruction buffer circuit 75 are connected to a multiplexing circuit 80. Due to decompression time required for class 1 instructions, it is highly likely that the uncompressed object code instructions routed to the multiplexing circuit 80 will be out of order. The multiplexing circuit 80 receives a signal to reorder the uncompressed object code instructions in the correct order prior to the instructions being output by the output buffer circuit 81. Collectively, the first instruction buffer circuit 79, the second instruction buffer circuit 75, the multiplexing circuit 80 and the output buffer circuit 80 are referred to the output buffer.

Referring to FIG. 19, a portion of the controller circuit 90 will be described in greater detail. The controller circuit 90 reorders the results in the first instruction buffer circuit 79 and the second instruction buffer circuit 75 so that the central processing unit can receive the decompressed object code instructions in the proper order. Each incoming compressed object code instruction is assigned a number which is used by the controller circuit 90 to determine the transfer order to the output buffer circuit 81. Referring to FIG. 19, the controller circuit 90 outputs an INSTR_ORDER signal to the multiplexing circuit 80 to control the proper ordering of uncompressed object code instructions.

The controller circuit also receives several other signals that are used to control the decompression engine functions. The controller circuit 90 receives a CPU_ADDR signal from the central processing unit that indicates the current memory address requested. The branch control circuit 77 extracts the branch annulling bit from compressed object code instructions routed to it and sends an ANNUL signal to the controller circuit 90. Also, the controller circuit 90 outputs a STALL signal that indicates if the decompression engine is full of instructions undergoing decompression. When a compressed object code instruction is retrieved from the input buffer circuit 70, a number (i.e., PRIORITY) is assigned to it, which corresponds to the order required by the central processing unit. This is needed since decompression time is variable, and later instructions may finish before earlier ones.

Note that the decompression engine will generally produce decompressed object code instructions out of order since different compressed object code instructions do not decompress at the same speed. Since, in each cycle, thirty-two bits are fed to the decompression engine, which can potentially correspond to more than one compressed object code instruction (due to compression), the decompression engine is super-scalar in design.

The decoding engine 82 (also referred to as the third decoding circuit) will now be described in greater detail. A plurality of register circuit 71 indexes the decoding table circuit 72 that was derived by the mathematical model during the object code instruction compression. The decoding table circuit 72 stores combinations of possible compressed bits appearing in the compressed object code instruction stream and their corresponding decompressed outputs. In the preferred embodiment, the decoding table circuit 72 is a non-volatile memory, but other types of circuitry could be used as well (e.g., FPGA). The decoding table circuit 72 also contains a next state that is written to the register circuits 71 in order to index to a new entry in the decoding table circuit 72. In the preferred embodiment, four register circuits are used because there can be up to four instructions being decompressed at the same time.

In the preferred embodiment, to decode a number of bits, two 32-bit words are read from the decoding table circuit 72. The first word from the decoding table circuit 72 contains possible compressed bit combinations appearing in the compressed object code instructions. The second word from the decoding table contains the corresponding decoded bits. Both 32-bit words are accessed in a single cycle. The decoded bits are accessed in the second cycle and the correct decoded bits are fed to the second instruction buffer circuit 75.

In the preferred embodiment, a comparator circuit 74 are used to select the correct set of bits as decoded by the decoding table circuit 72. The outputs from the decoding table circuit 72 are written to a second local buffer 73. The 32-bit word from the decoding table circuit 72 that includes the possible bit combinations is loaded into the comparator circuit 74, along with the encoded bits from the compressed object code instruction. The comparator circuit 74 matches the bits of the compressed object code instruction with the possible bit combinations from the decoding table circuit 74, and outputs the result to second instruction buffer 75. The bits that are output are only a portion of a decompressed object code instruction. After decoding, the comparator circuit 74 routes bits back to the register circuit 71, since some of the bits may be necessary for continuing the decompression of the compressed object code instruction. Whether these bits are needed to continue the decompression of the compressed object code instruction currently being decompressed is dictated by the decoding table circuit 72.

Figure 21:
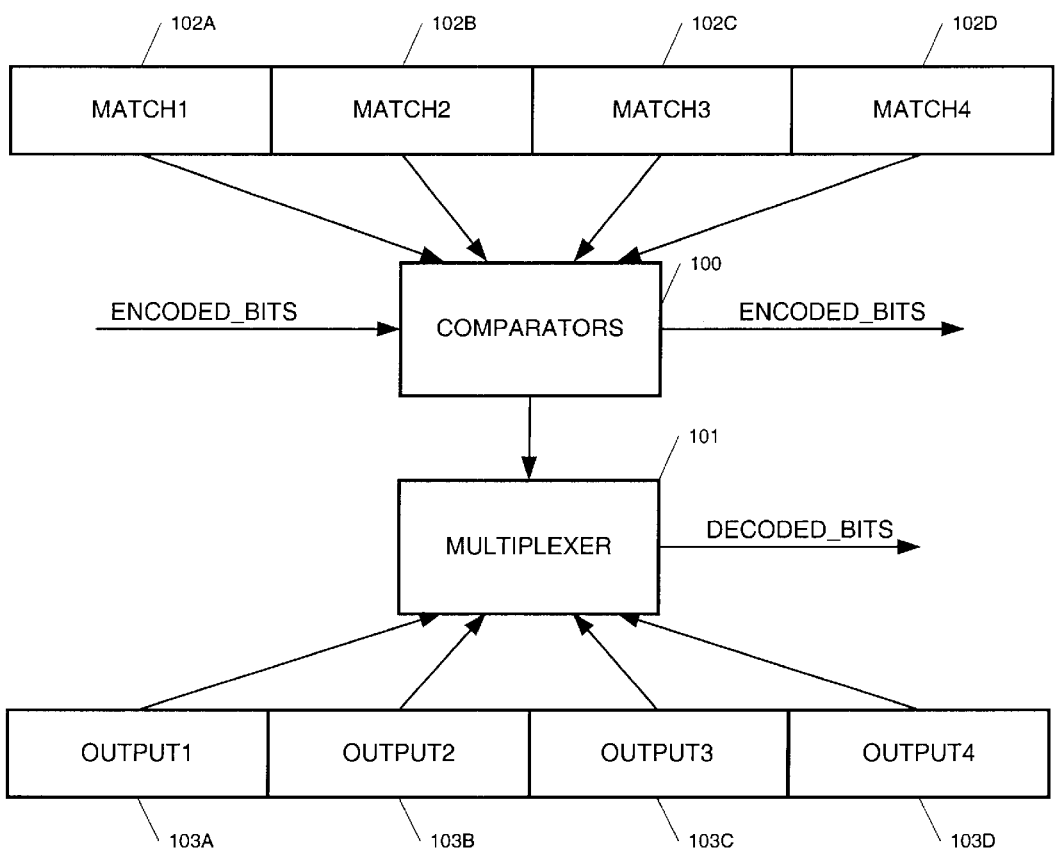
FIG. 21 illustrates the comparator portion of the decompression engine embodiment wherein encoded bits are matched and the decoded bits are output.

Referring to FIG. 21, the comparator circuit 74 will be described in greater detail. In the preferred embodiment, the comparator circuit 74 includes a plurality of comparators 100. These comparators 100 determine which set of possible bit combinations match a portion of the compressed object code instruction input into the comparators 100. In FIG. 21, the possible bit combinations are represented by MATCH1–MATCH4, which are loaded into the compressed registers 102A–102D. The output of the 8-bit registers 102A–102D is input to the comparators 100. The portion of the compressed object code instruction, represented as ENCODED_BITS, is input into the comparators. The uncompressed registers 103A–103D are loaded with the uncompressed bits that correspond to the compressed bits loaded into the compressed registers 102A–102D. In FIG. 21, the uncompressed output bits that correspond to MATCH–MATCH4 are represented by OUTPUT1–OUTPUT4. When the comparators 100 match the ENCODED_BITS to MATCH1, MATCH2, MATCH3, or MATCH4, a signal is sent to a multiplexing circuit 101. The multiplexing circuit 101 selects OUTPUT1, OUTPUT2, OUTPUT3 or OUTPUT4 to output as DECODED_BITS, which is routed to the second instruction buffer. It is important to understand that this procedure will take several cycles to decompress one whole uncompressed object code instruction, and thus this path is the slowest. In each cycle, only six to eight bits are written into the second instruction buffer circuit 75.

Figure 22:
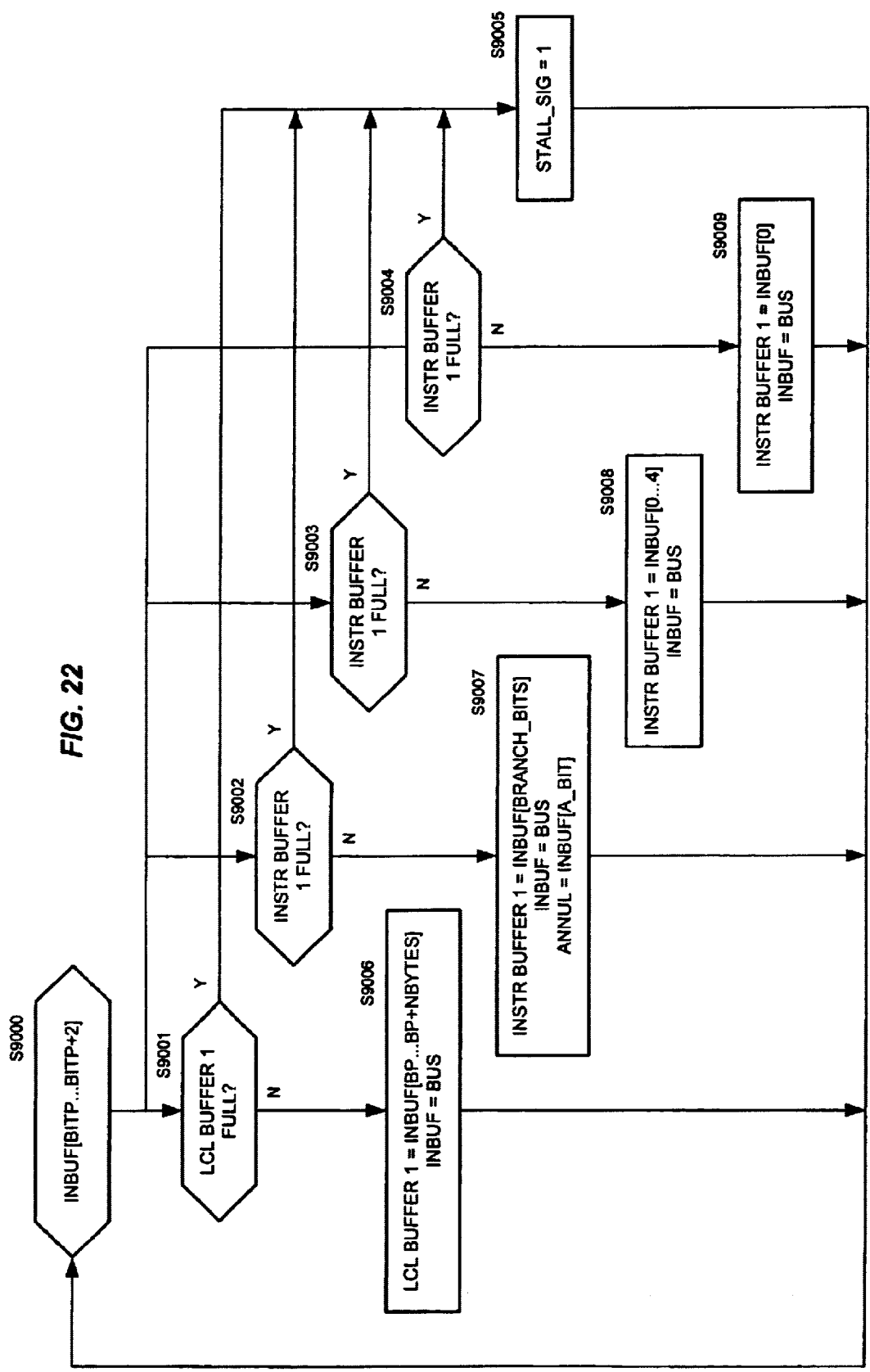
FIG. 22 is an ASM chart illustrating the cycle-by-cycle progression of the process of decomposition and decompression of the compressed object code instruction.

Referring to FIG. 22, an ASM chart illustrates the logic behind the pipeline. ASM charts differ from flow charts as they show the cycle-by-cycle operation of a design. All operations in one box can be performed in the same cycle.

Steps S9001 and S9006 show the cycling of the portion of the decompression engine that decompresses class 1 instructions. At Step S9001, if the first local buffer 76 is full, the decompression engine generates the STALL signal in Step S9005. Otherwise, several bytes are transferred from the input buffer circuit to the first local buffer 76 in Step S9006.

Steps S9002 and S9007 show the cycling of the portion of the decompression engine that decompresses class 2 instructions. At Step S9002, if the first instruction buffer 79 is full, the decompression engine generates the STALL signal in Step S9005. Otherwise, the class 2 instruction, including the annul bit, is decompressed in Step S9007.

Steps S9003 and S9008 show the cycling of the portion of the decompression engine that decompresses class 4 instructions. At Step S9003, if the first instruction buffer 79 is full, the decompression engine generates the STALL signal in Step S9005. Otherwise, the class 4 instruction is decompressed in Step S9008.

Steps S9004 and S9009 show the cycling of the portion of the decompression engine that decompresses class 3 instructions. At Step S9003, if the first instruction buffer 79 is full, the decompression engine generates the STALL signal in Step S9005. Otherwise, the class 3 instruction is decompressed in Step S9009.

In case of a branching instruction, the ANNUL signal is set by the branch control circuit 77 which may result in flushing. The STALL signal is also generated, if the class 1 instruction pipeline or first instruction buffer circuit 79 are full. In such cases, the input buffer circuit 70 is not updated with compressed object code instructions from the bus.

In general, the decompression engine may stall for the following reasons:

1. The first local buffer circuit 76 storing class 1 compressed object code instructions is full and cannot accept any more words from the input buffer circuit 70 (all stages are working). If first local buffer circuit 76 is full, the STALL signal is used to tell the central processing unit to stop providing addresses, and no more compressed object code instruction are written to the input buffer circuit 70.
2. The first instruction buffer circuit 79 that stores the results of the decompression of class 2, class 3 and class 4 compressed object code instructions may be full. The STALL signal prevents any more writing and fetching from cache, until an empty slot is available in the first instruction buffer circuit 79.
3. A branching instruction has altered the flow and some entries need to be flushed. For the SPARC architecture, this is typically the case where an instruction has been inserted in the delay slot and must be flushed due to a change in program flow.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

Thus, while only certain embodiments of the invention have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A method for compressing uncompressed object code instructions from an executable program for a computer, wherein the uncompressed object code instructions are compressed to reduce power consumption, the method comprising:

(a) decomposing the uncompressed object code instructions into at least four predetermined instruction classes;

(b) excluding predetermined types of uncompressed object code instructions from a derivation of a mathematical model for compressing predetermined uncompressed object code instructions, wherein the remaining uncompressed object code instructions are used to derive the mathematical model;

(c) compressing uncompressed object code instructions from the first predetermined instruction class, wherein the uncompressed object code instructions are compressed using the derived mathematical model, and building a decoding table for the compressed object code instructions in accordance with the derived mathematical model;

(d) compressing uncompressed object code instructions from the second predetermined instruction class, wherein an address offset is added to each object code instruction following its compression;

(e) compressing uncompressed object code instructions from the third predetermined instruction class, wherein each uncompressed object code instruction is assigned an index value into a first decompression look-up table; and (f) patching each address offset that was added to a compressed instruction.

2. The method for compressing uncompressed object code instructions as claimed in claim 1, the method further including:

(a) retrieving an uncompressed object code instruction for analysis from the executable object code instructions to be compressed;

(b) determining if the extracted uncompressed object code instruction is a branching instruction, and based on that determination, assigning the extracted uncompressed object code instruction to the second predetermined instruction class;

(c) determining if the extracted uncompressed object code instruction has an immediate field and is compressible, and based on that determination, assigning the extracted uncompressed object code instruction to the first predetermined instruction class;

(d) determining if the extracted object code instruction does not have an immediate field, and based on that determination, assigning the extracted object code instruction to the third predetermined instruction class;

(e) assigning the extracted uncompressed object code instruction to the fourth predetermined instruction class if the object code instruction is not assigned to the first, second or third predetermined instruction classes; and (f) determining if there are more uncompressed object code instructions to analyze, and based on that determination, repeating steps (a) through (e).

3. The method for compressing uncompressed object code instructions as claimed in claim 2, the method further including creating a decompression look-up table for extracted instructions assigned to the third predetermined instruction class, wherein the previously assigned index value into the first decompression look-up table is inserted into the compressed instruction.

4. The method for compressing uncompressed object code instructions as claimed in claim 3, the method further including appending a first predetermined bit sequence to the index value inserted into each compressed instruction from the third predetermined instruction class.

5. The method for compressing uncompressed object code instructions as claimed in claim 2, the method further including appending a second predetermined bit sequence to the uncompressed instruction from the fourth predetermined instruction class.

6. The method for compressing uncompressed object code instructions as claimed in claim 1, the method further including:

(a) extracting an object code instruction from the executable program;

(b) determining if the extracted object code instruction is a non-branching instruction or does not have an immediate field, and based on that determination, saving the extracted object code instruction for mathematical modeling; and (c) repeating steps (a) through (b) if there are more object code instructions to analyze.

7. The method for compressing uncompressed object code instructions as claimed in claim 6, the method further including deriving a mathematical model for the compression of object code instructions based upon the saved object code instructions.

8. The method for compressing uncompressed object code instructions as claimed in claim 1, the method further including:

(a) extraction of a non-branching object code instruction with immediate field from the executable program;

(b) compression of the non-branching object code instruction with immediate field using table-based mathematical encoding while maintaining track of branching instruction addresses;

(c) repeating steps (a) through (b) if there are more object code instructions to compress; and (d) if no more non-branching object code instructions with immediate field remain to be compressed, then build a second decoding table for non-branching object code instructions according to the mathematical model.

9. The method for compressing uncompressed object code instructions as claimed in claim 8, the method further including:

(a) compressing branching object code instructions using branching instruction addresses obtained during the compression of the non-branching object code instructions with immediate fields;

(b) recalculating branching instruction target addresses; and (c) patching branch instruction target address offsets to point to new branching instruction target addresses.

10. The method for compressing uncompressed object code instructions as claimed in claim 9, the method further including appending a third predetermined bit sequence to the index inserted into a compressed instruction from the first predetermined instruction class.

11. The method for compressing uncompressed object code instructions as claimed in claim 9, the method further including appending a fourth predetermined bit sequence to the index inserted into a compressed instruction from the second predetermined instruction class.

12. The method for compressing uncompressed object code instructions as claimed in claim 11, the method further including appending a second index to a compressed instruction from the second predetermined instruction class, wherein the second index indicates the number of bits used for the compressed object code instruction.

13. A computer system adapted to compressing uncompressed object code instructions from an executable program for a computer, wherein the uncompressed object code instructions are compressed to reduce power consumption, the computer system including:

a processor;

a memory including software instructions adapted to enable the computer system to perform the steps of:

(a) decomposing the uncompressed object code instructions into at least four predetermined instruction classes;

(b) excluding predetermined types of uncompressed object code instructions from a derivation of a mathematical model for compressing predetermined uncompressed object code instructions, wherein the remaining uncompressed object code instructions are used to derive the mathematical model;

(c) compressing uncompressed object code instructions from the first predetermined instruction class, wherein the uncompressed object code instructions are compressed using the derived mathematical model, and building a decoding table for the compressed object code instructions in accordance with the derived mathematical model;

(d) compressing uncompressed object code instructions from the second predetermined instruction class, wherein an address offset is added to each object code instruction following its compression;

(e) compressing uncompressed object code instructions from the third predetermined instruction class, wherein each uncompressed object code instruction is assigned an index value into a first decompression look-up table; and (f) patching each address offset that was added to a compressed instruction.

14. A computer system adapted to compressing uncompressed object code instructions as claimed in claim 13, wherein the software instructions are further adapted to enable the computer system to download the compressed object code instructions to a memory resident on an embedded computer system.

15. A computer system adapted to compressing uncompressed object code instructions as claimed in claim 14, wherein the software instructions are further adapted to enable the computer system to save the compressed object code instructions to a memory resident on an embedded computer system.

16. A computer system adapted to compressing uncompressed object code instructions as claimed in claim 13, wherein the software instructions are further adapted to enable the computer system to dynamically debug the downloaded compressed object code instructions resident on an embedded computer system.

17. A computer program product for enabling a computer system to compress uncompressed object code instructions from an executable program for an embedded computer, wherein the uncompressed object code instructions are compressed to reduce power consumption, the computer program product including:

software instructions for enabling the computer system to perform predetermined operations, and a computer readable medium bearing the software instructions;

the predetermined operations including:
  (a) decomposing the uncompressed object code instructions into at least four predetermined instruction classes;
  (b) excluding predetermined types of uncompressed object code instructions from a derivation of a mathematical model for compressing predetermined uncompressed object code instructions, wherein the remaining uncompressed object code instructions are used to derive the mathematical model;
  (c) compressing uncompressed object code instructions from the first predetermined instruction class, wherein the uncompressed object code instructions are compressed using the derived mathematical model, and building a decoding table for the compressed object code instructions in accordance with the derived mathematical model;
  (d) compressing uncompressed object code instructions from the second predetermined instruction class, wherein an address offset is added to each object code instruction following its compression;
  (e) compressing uncompressed object code instructions from the third predetermined instruction class, wherein each uncompressed object code instruction is assigned an index value into a first decompression look-up table; and
  (f) patching each address offset that was added to a compressed instruction.

* * * * *